United States Patent
Cuch et al.

(10) Patent No.: US 7,056,969 B2
(45) Date of Patent: Jun. 6, 2006

(54) INK JET RECORDING MATERIAL SUITABLE FOR USE IN WIDE FORMAT PRINTING APPLICATIONS

(75) Inventors: Simon Roberto Cuch, East Longmeadow, MA (US); George Roderick Stevens, Jr., Wilbraham, MA (US)

(73) Assignee: Kanzaki Specialty Papers, Inc., Ware, MA (US)

(*) Notice: Subject to any disclaimer, the term of this patent is extended or adjusted under 35 U.S.C. 154(b) by 251 days.

(21) Appl. No.: 10/267,290

(22) Filed: Oct. 8, 2002

(65) Prior Publication Data

US 2003/0162009 A1    Aug. 28, 2003

Related U.S. Application Data

(60) Provisional application No. 60/328,180, filed on Oct. 9, 2001.

(51) Int. Cl.
*C08K 3/26* (2006.01)
*C08K 3/20* (2006.01)
*C08K 3/36* (2006.01)
*C08L 29/04* (2006.01)

(52) U.S. Cl. .................. 524/425; 524/430; 524/492; 524/503

(58) Field of Classification Search ............ 524/425, 524/430, 445, 492, 500, 503
See application file for complete search history.

(56) References Cited

U.S. PATENT DOCUMENTS

| | | | | |
|---|---|---|---|---|
| 5,185,213 A * | 2/1993 | Fujita et al. | ............ | 428/32.37 |
| 5,190,805 A | 3/1993 | Atherton et al. | | |
| 5,206,071 A | 4/1993 | Atherton et al. | | |
| 5,320,897 A * | 6/1994 | Kondo et al. | ............ | 428/32.36 |
| 5,478,631 A | 12/1995 | Kawano et al. | | |
| 5,532,064 A | 7/1996 | Lubar | | |
| 5,616,409 A * | 4/1997 | Matsuda et al. | ........ | 428/32.18 |
| 5,619,241 A * | 4/1997 | Hosoi et al. | ............ | 428/32.37 |
| 5,660,928 A | 8/1997 | Stokes et al. | | |
| 5,677,067 A * | 10/1997 | Kojima et al. | ........... | 428/32.27 |
| 5,721,086 A | 2/1998 | Emslander et al. | | |
| 5,747,148 A | 5/1998 | Warner et al. | | |
| 5,882,388 A | 3/1999 | Adair et al. | | |
| 5,919,558 A * | 7/1999 | Chao | ................. | 428/32.18 |
| 5,952,104 A * | 9/1999 | Sugiyama et al. | ....... | 428/32.34 |
| 5,984,467 A | 11/1999 | Bodager et al. | | |
| 6,129,785 A | 10/2000 | Schliesman et al. | | |
| 6,150,289 A * | 11/2000 | Chen et al. | ............ | 501/148 |
| 6,153,288 A | 11/2000 | Shih et al. | | |
| 6,197,409 B1 | 3/2001 | Bodager et al. | | |
| 6,200,647 B1 | 3/2001 | Emslander et al. | | |
| 6,214,449 B1 * | 4/2001 | Otani et al. | ............ | 428/32.24 |
| 6,225,381 B1 | 5/2001 | Sharma et al. | | |
| 6,383,611 B1 * | 5/2002 | Kohno et al. | ............ | 428/32.34 |
| 6,441,076 B1 * | 8/2002 | Boylan | ................. | 524/425 |
| 6,482,883 B1 * | 11/2002 | Cuch et al. | ............ | 524/492 |
| 6,517,929 B1 * | 2/2003 | Shibatani et al. | .......... | 427/152 |
| 6,543,888 B1 * | 4/2003 | Nishita | ................. | 347/98 |
| 6,562,451 B1 * | 5/2003 | Syoda et al. | ........... | 428/330 |
| 6,613,418 B1 * | 9/2003 | Tachikawa et al. | ........ | 428/323 |

FOREIGN PATENT DOCUMENTS

| | | | |
|---|---|---|---|
| DE | 195 34 327 A | | 2/1996 |
| EP | 947349 A2 * | | 10/1999 |
| EP | 1 090 776 A | | 4/2001 |
| JP | 03251487 A * | | 11/1991 |
| JP | 2000280607 A * | | 9/2002 |
| WO | WO 00 01539 A | | 1/2000 |
| WO | WO 200145956 A1 * | | 6/2001 |

OTHER PUBLICATIONS

Machine Translation of JP 2000280607 A.*

* cited by examiner

*Primary Examiner*—Callie Shosho
(74) *Attorney, Agent, or Firm*—Holland & Bonzagni, P.C.; Mary R. Bonzagni, Esq.

(57) ABSTRACT

An aqueous coating formulation for use in preparing ink jet recording materials is provided. The coating formulation, which employs porous pigments and/or metal oxide gels in combination with inorganic pigments (i.e., calcium carbonate and mixtures of calcium carbonate and alumina), has a relatively high binder-to-pigment dry weight ratio. An ink jet recording material prepared using such an aqueous coating formulation is also provided. The ink jet recording material demonstrates good printability and provides images having excellent water and humidity resistance and high image densities. In a preferred embodiment, the inventive recording material further demonstrates good light or fade resistance.

21 Claims, No Drawings

INK JET RECORDING MATERIAL SUITABLE FOR USE IN WIDE FORMAT PRINTING APPLICATIONS

RELATED APPLICATION

This application claims priority from U.S. Provisional Patent Application Ser. No. 60/328,180, filed Oct. 9, 2001.

FIELD OF THE INVENTION

The present invention generally relates to an aqueous coating formulation for use in preparing ink jet recording materials. The ink jet recording materials are suitable for use in wide format printing applications, demonstrate good printability and can provide images having excellent water and humidity resistance and high image densities. In a preferred embodiment, the inventive recording material further demonstrates good light or fade resistance.

BACKGROUND OF THE INVENTION

Wide format ink jet recording materials are typically manufactured as wide rolls (i.e., greater than or equal to 24 inches in width), and are roll-fed into large printers for imaging. These materials are commonly used in commercial settings for applications including large advertisements, movie theater posters, outdoor signage and the like.

Unlike narrow format ink jet recording materials, wide format materials, which are intended for long distance viewing, are required to meet more rigorous performance standards. For example, long distance viewing demands heightened acuity or sharpness in formed images and increased color gamut, background brightness and whiteness. In addition, wide format ink jet materials are often exposed to different use environments (e.g., outdoor use), which place additional demands on these materials in terms of color stability, resistance to light-induced fading, waterfastness, humidity resistance, abrasion resistance, and the like. It is further noted that wide format ink jet recording materials may encounter more ink per unit area when run through certain commercial printers and thus must effectively address problems with poor image quality, color bleed, smearing and cockle.

Prior art attempts to meet these more rigorous performance requirements include the use of fluorescent whitening agents in ink jet coatings to increase the background brightness and whiteness of resulting recording materials. Fluorescent whitening agents, however, degrade and, to a lesser extent, react with other coating components thereby contributing to the yellowing (i.e., poor light or fade resistance) of the resulting ink jet recording material.

Efforts to minimize this effect include decreasing the level of fluorescent whitening agents in the ink jet coating. Unfortunately, the corresponding decrease in background brightness/whiteness renders such materials less suitable for use in wide format printing applications. Attempts to correct this deficiency by using superior or more expensive grades of exceptionally white and bright base paper, adversely impacts upon the economics of these materials.

U.S. Pat. No. 6,129,785 to Schliesman et al. discloses a low pH aqueous suspension for application to optionally sized substrates, such as paper. The aqueous suspension comprises: absorptive silica pigment (e.g., a mixture of ≧75% silica gel having a pore volume of 0.5 to 1.5 cc/g and a ≧10% alumina or alumina hydrate), a polyvinyl alcohol binder (e.g., low molecular weight, partially hydrolyzed polyvinyl alcohols) and a cationic fixing agent (e.g., polydiallyl dimethyl ammonium chloride), dispersed at low pH ranges of 4.0 to 7.5. The acidic pH of the aqueous suspension is believed to enhance cationic function resulting in rapid dry times and improved ink hold out and color density.

Recording materials prepared from low pH coating compositions, however, are less suitable for use in wide format printing applications where these materials tend to be less stable and thus more susceptible to fading and yellowing. Moreover, images formed on the recording materials described in Schliesman et al. have image densities that are too low to render these materials suitable for use in wide format printing applications.

In view of the above, a need exists for bright, white ink jet recording materials, which are not susceptible to fading or yellowing, and which provide images having high image densities.

It is, therefore, an object of the present invention to provide such an ink jet recording material.

It is a more particular object to provide an ink jet recording material suitable for use in wide format printing applications, which demonstrates good printability and which can provide images having excellent water and humidity resistance and high image densities.

It is yet a more particular object of the present invention to provide an economical, bright, white ink jet recording material, which demonstrates good printability and good light or fade resistance, and which provides images having excellent water and humidity resistance and high image densities.

SUMMARY OF THE INVENTION

The present invention therefore provides an aqueous coating formulation having a relatively high binder-to-pigment dry weight ratio, which comprises:
  (i) from about 45 to about 80% by dry wt., based on the total dry weight of the coating formulation, of a pigment composition comprising from about 10 to about 90% by dry wt., based on the total dry weight of the pigment composition, of a first pigment selected from the group of porous organic pigments, porous inorganic pigments, metal oxide gels and mixtures thereof, and from about 90 to about 10% by dry wt., based on the total dry weight of the pigment composition, of a second pigment selected from the group of calcium carbonate and mixtures of calcium carbonate and alumina,
    wherein the sum of the pigment composition components total 100% by dry wt.;
  (ii) from about 10 to about 45% by dry wt., based on the total dry weight of the coating formulation, of a water-soluble binder selected from the group of super, fully and partially hydrolyzed polyvinyl alcohols and mixtures thereof and, optionally, one or more cationic acrylic resins;
  (iii) from about 1 to about 25% by dry wt., based on the total dry weight of the coating formulation, of a cationic resin;
  (iv) an effective amount of an optionally fluorescent whitening agent; and
  (v) optionally, an effective amount of a blueing dye,
    wherein, the sum of the coating formulation components total 100% by dry wt.,
    wherein, the binder/pigment dry weight ratio in the coating formulation ranges from about 1:8 to about 1:1, and wherein, when an optionally fluorescent whitening agent and a blueing dye are present in the coating formulation, the optionally fluorescent whitening agent/blueing dye dry weight ratio in the formulation ranges from about 1:1 to about 1000:1.

The present invention also provides a method for preparing the aqueous coating formulation described above, which comprises:

(i) preparing an aqueous solution of the optionally fluorescent whitening agent; and then
(ii) adding the remaining components in the following order of addition: cationic resin, first pigment, second pigment, remaining components.

The present invention further provides an ink jet recording material, which comprises:

(a) a substrate;
(b) optionally, one or more undercoat layers located on the substrate, which is/are prepared using an aqueous coating formulation comprising:
  (i) one or more pigments;
  (ii) one or more binders;
  (iii) optionally, one or more dispersing agents; and
  (iv) an effective amount of an optionally fluorescent whitening agent,
  wherein, the sum of the coating formulation components total 100% by dry wt., and
  wherein, the pigment/binder dry weight ratio in the coating formulation ranges from about 1:1 to about 20:1; and
(c) one or more ink jet receptive layers located on the optional undercoat layer(s) and/or on the substrate, which is/are prepared using the aqueous coating formulation described above.

The foregoing and other features and advantages of the present invention will become more apparent from the following description.

DETAILED DESCRIPTION OF THE INVENTION

Although the present inventive ink jet recording material will be described herein mainly in reference to wide format printing applications, it is not so limited. The inventive material can be used in any application, including narrow format printing applications, where good printability and sharp, water and humidity resistant images, are desired.

As is well known to those skilled in the art, high binder-to-pigment ratios in ink jet coating formulations limit the machine coatability of such coating formulations and serve to reduce the maximum ink absorbency, interfere with the ink drying time and reduce the maximum coat weight of the resulting ink jet layer. By way of the present invention, it has been discovered that coating formulations having relatively high binder-to-pigment dry weight ratios, which employ porous pigments and/or metal oxide gels in combination with inorganic pigments (i.e., calcium carbonate and mixtures of calcium carbonate and alumina) produce ink jet receptive layers which demonstrate good printability and which provide images having excellent water and humidity resistance and high image densities.

Suitable porous organic pigments for use as the first pigment in the pigment composition of the coating formulation used to prepare the ink jet receptive layer of the present invention include acrylic resins such as polymethyl methacrylate, polymethylacrylate, polyacrylonitrile, poly(vinylpolypyrrolidone), styrene resins such as polystyrene, polymethylstyrene and the like, as well as styrene-acrylic resins, urea-formaldehyde resins, polyvinyl chlorides, polycarbonates, etc. Suitable porous inorganic pigments include porous alumina, porous sodium aluminosilicate, porous calcium carbonate, porous clays, porous magnesium carbonate, porous synthetic amorphous silica and the like.

The average diameter of pores in the porous organic and inorganic pigments is preferably from about 1 to about 800 nanometers, while the volume of pores in these pigments is preferably from about 0.4 to about 3.0 cubic centimeters per gram (cc/g).

Metal oxide gels, suitable for use as the first pigment in the pigment composition of the subject coating formulation include alumina gels, silica gels, polymeric gels such as melamine formaldehyde (M-F) gels, phenol-furfural (P-F) gels, resorcinol-formaldehyde (R-F) gels, urea-formaldehyde (U-F) gels, titania gels and the like.

In a preferred embodiment, the first pigment is a metal oxide gel. In yet a more preferred embodiment, the metal oxide gel is a silica gel having a surface area ranging from about 200 to about 800 square meters per gram ($m^2/g$), a pore volume ranging from about 0.4 to about 3.0 cc/g, an average particle size ranging from about 1 to about 17μ and a pH ranging from about 2.5 to about 10.5.

Specific preferred examples of silica gels having surface areas, pore volumes, average particle sizes and pHs falling within the ranges specified above, include SYLOID 620 and 234 wax-free silica gels, SYLOID 7000 wax surface-treated silica gels and SYLOID 74 (grade 4500, 5500 and 6500) silica gels, marketed by Grace Davison, W.R. Grace & Co., 7500 Grace Drive, Columbia, Md. 21044 ("Grace Davison").

The first pigment is present in the pigment composition in an amount ranging from about 10 to about 90% by dry wt., preferably from about 20 to about 80% by dry wt., based on the total dry weight of the pigment composition. The present inventor has found that if the first pigment is employed in an amount which exceeds 90% by dry wt., a decrease in optical or image densities will be observed, and if the first pigment is employed in an amount which falls below 10% by dry wt., an increase in the degree of wicking or spread of water or ink will also be observed.

The pigment composition of the coating formulation of the present invention also contains a porous or non-porous second pigment which appears to aid in the preservation or maintenance of an open structure in the ink jet receptive layer, upon drying, even at high binder-to-pigment dry weight ratios. The second pigment is selected from the group including calcium carbonate and mixtures of calcium carbonate and alumina.

In a preferred embodiment, the second pigment is calcium carbonate and, more preferably, is a precipitated calcium carbonate (PCC) pigment possessing a surface area ranging from about 10 to about 300 square meters per gram ($m^2/g$), a particle size ranging from about 0.1 to about 5μ and rheology of a thixotropic nature thus facilitating application of the resulting coating formulation under high shear conditions such as air knife or blade coaters.

Specific examples of PCCs possessing rheology of a thixotropic nature are available from Minerals Technologies Inc., 35 Highland Avenue, Bethlehem, Pa. 18017, under the trade designation JETCOAT 30 precipitated calcium carbonate, and from Fitz Chem Corporation, 185 Industrial Drive, Elmhurst, Ill. 60126-1601, under the trade designation MAGNUM GLOSS precipitated calcium carbonate.

In another preferred embodiment, the second pigment is a mixture comprising from about 60 to about 99% by dry wt. (and more preferably from about 80 to about 95% by dry wt.) of calcium carbonate and from about 40 to about 1% by dry wt. (and more preferably from about 20 to about 5% by dry wt.) of an alumina pigment.

Anhydrous alumina and alumina hydrate pigments are preferred. As the anhydrous alumina there may be used any of the various crystalline alumina such as α-alumina, β-alumina and γ-alumina. As the alumina hydrate there may be used either alumina monohydrate or trihydrate. Examples of the alumina monohydrate include pseudoboehmite, boehmite and diaspore. Examples of the alumina trihydrate include gibbsite and bayerite. Preferred among these alumina pigments is alumina trihydrate.

The average particle diameter of the alumina pigment to be used herein is preferably from about 0.1 to about 3.0μ, more preferably from about 0.4 to about 2.0μ. The alumina pigment to be used herein may or may not be porous but is preferably porous. The average diameter of pores in the particulate alumina pigment is preferably from about 0.5 to about 300 nanometers. The volume of pores in the particulate alumina pigment is preferably from about 0.1 to about 2.1 cc/g.

The second pigment is present in the pigment composition in an amount ranging from 90 to about 10% by dry wt., preferably from about 80 to about 20% by dry wt., based on the total dry weight of the pigment composition. The present inventor has found that if the second pigment is employed in an amount below 10% by dry wt., a decrease in optical or image densities will be observed, and if the second pigment is employed in an amount above 90% by dry wt., an increase in the degree of wicking will also be observed.

The subject pigment composition may contain additional components including, but not limited to, barium sulfate, clays, talc, titanium dioxide, zinc oxide and mixtures thereof.

The pigment composition is present in the coating formulation in an amount ranging from about 45 to about 80% by dry wt., preferably from about 50 to about 75% by dry wt., based on the total dry weight of the coating formulation.

The water-soluble binder of the coating formulation of the present invention is selected from the group consisting of super, fully and partially hydrolyzed polyvinyl alcohols and mixtures thereof and, optionally, one or more cationic acrylic resins.

The term "super hydrolyzed," as used herein, is intended to refer to those polyvinyl alcohols having a % hydrolysis ranging from about 99 to about 100, while the term "fully hydrolyzed" refers to a % hydrolysis ranging from about 97 to about 99. The term "partially hydrolyzed," on the other hand, denotes a polyvinyl alcohol having a % hydrolysis of from about 70 to about 96.

The super hydrolyzed polyvinyl alcohols of the present invention preferably have a % hydrolysis of from about 99.3 to about 99.6, while the fully hydrolyzed polyvinyl alcohols preferably have a % hydrolysis of from about 98 to about 98.8. The partially hydrolyzed polyvinyl alcohols preferably have a % hydrolysis of from about 84 to about 92.

The super, fully and partially hydrolyzed polyvinyl alcohols of the water-soluble binder have medium-to-low molecular weights which range from about 5,000 to about 186,000 (preferably from about 13,000 to about 150,000) and may be modified by adding a cation thereto. More specifically, the polyvinyl alcohols may be modified by silanol, carboxy and/or quaternary amine groups.

Specific preferred examples of super, fully and partially hydrolyzed, medium-to-low molecular weight, polyvinyl alcohols are available from Air Products and Chemicals, Inc., 7201 Hamilton Blvd., Allentown, Pa. 18196-1501 ("Air Products") and are sold under the trade designations AIRVOL 125 super hydrolyzed, medium molecular weight, polyvinyl alcohol, AIRVOL 325 fully hydrolyzed, medium molecular weight, polyvinyl alcohol, AIRVOL 523 partially hydrolyzed, medium molecular weight, polyvinyl alcohol and AIRVOL 205 partially hydrolyzed, low molecular weight, polyvinyl alcohol.

The water-soluble binder may further comprise from about 1 to about 50% by dry wt., based on the total dry weight of the water-soluble binder, of a cationic acrylic resin. The cationic acrylic resin serves to fix ink jet dyes and appears to enhance the color range or gamut of printed media. Suitable examples of such cationic acrylic resins include cationic styrene-acrylic resins, cationic styrene-acrylic copolymers, amide-modified cationic styrene-acrylic resins and cationic vinyl acrylic resins. Preferred cationic acrylic resins are cationic styrene-acrylic copolymers, which are available from Westvaco Corporation, Chemical Division, P.O. Box 70848, Charlestown Heights, S.C. 29415, and are sold under the trade designation TRUDOT P2605 cationic styrene-acrylic copolymers.

The water-soluble binder may contain additional components (e.g., alginate, biocides, casein, cellulose derivatives, CMC, hydroxymethyl cellulose, hydroxypropyl cellulose, water soluble gums, latex, amphoteric latex, maleic anhydride resins, melamine resins, polyacrylamide resins, polyester resins, polyvinyl acetate, polyvinyl pyrrolidone, polyvinyl pyrrolidone vinyl acetate copolymers, modified starch, ethoxylated starch, cationic starch, oxidized starch and blends thereof) provided any such additional components(s) does not adversely impact upon the desirable properties of the binder.

In a more preferred embodiment, the water-soluble binder comprises:

(a) from about 10 to about 90% by dry wt. (more preferably from about 20 to about 80% by dry wt.) of a super hydrolyzed, medium viscosity polyvinyl alcohol;

(b) from about 10 to about 70% by dry wt. (more preferably from about 15 to about 65% by dry wt.) of a partially hydrolyzed, medium viscosity polyvinyl alcohol; and (c) from about 0 to about 20% by dry wt. (more preferably from about 5 to about 15% by dry wt.) of a partially hydrolyzed, low viscosity polyvinyl alcohol.

The water-soluble binder preferably has a medium-to-low viscosity. More specifically, the binder has a preferred viscosity ranging from about 3 to about 40 centipoise (cps), as measured by a Brookfield Viscosimeter, model number DV-II+, using a 4% polyvinyl alcohol aqueous solution at 20° C.

The binder/pigment dry weight ratio in the coating formulation used to prepare the ink jet receptive layer of the present invention ranges from about 1:8 to about 1:1, preferably ranges from about 1:6 to about 1:1.5, and more preferably ranges from about 1:2.8 to about 1:1.8.

The present inventor has found that if the binder/pigment ratio exceeds 1:1 (i.e., the binder is present in an amount which is greater than the amount of pigment), an increase in the degree of wicking and intercolor bleeding will be observed, while if the ratio falls below 1:8 (i.e., the binder is present in an amount which is less than 12.5% of the amount of pigment), a decrease in optical or image densities will be observed.

The water-soluble binder is present in the coating formulation in an amount ranging from about 10 to about 45% by dry wt., preferably from about 15 to about 40% by wt., based on the total dry weight of the coating formulation.

The cationic resin of the coating formulation of the present invention serves as a fixing agent of ink and improves the fixing of recorded images and water resistance.

Preferred cationic resins include polyvinyl benzyl trimethyl ammonium chloride, polydiallyl dimethyl ammonium chloride, polymethacryloxyethyl hydroxy ethyldiammonium chloride, quaternary acrylic copolymer latex, amidoepichlohydrin copolymer, dimethylaminoethylmethacrylate copolymer, vinyl pyrrolidone dimethylaminoethylmethacrylate copolymer, polyallylamine, polyvinylamine, vinyl amine acrylonitrile copolymers, polyalkylene imine polymers, polyalkylene polyamine polymers, polyalkylene polyamide dicyandiamide copolymers, polyamide dicyandiamide copolymers, quaternary ammonium polymers and blends thereof. In a preferred embodiment, the cationic resin is a quaternary ammonium polymer and, more preferably, is polydiallyl dimethyl ammonium chloride marketed by Calgon Corporation, 2015 Christine Drive, Harleysville, Pa. 19438 under the trade designation CP-1030.

The cationic resin is present in the coating formulation in an amount ranging from about 1 to about 25% by dry wt., preferably from about 3 to about 15% by dry wt., based on the total dry weight of the coating formulation. If the cationic resin is present in an amount below 1% by dry wt., the water resistance of the composition is very poor, and if the cationic resin is present in an amount above 25% by dry wt., printed image quality is adversely affected.

The optionally fluorescent whitening agent is added to the coating formulation of the present invention to increase the whiteness, brightness and bluish shade of the resulting ink jet recording material. Examples of such whitening agents include disulfonated, tetrasulfonated and hexasulfonated stilbene derivatives. In a preferred embodiment, the agent is a hexasulfonated stilbene derivative, which is available from Ciba Specialty Chemical Corp., 540 White Plains Road, Tarrytown, N.Y. 10591 ("Ciba Specialty"), under the product designation TINOPAL ABP-A, and is present in an amount ranging from about 0.01 to about 1.5% by dry wt., preferably from about 0.1 to about 0.8% by dry wt., based on the total dry weight of the coating formulation.

The whitening agent may employ a fluorescing agent, which absorbs energy in the UV region and emits light largely in the blue region.

In a preferred embodiment, the coating formulation further comprises from about 0.001 to about 0.05% by dry wt., preferably from about 0.002 to about 0.007% by dry wt., based on the total dry weight of the coating formulation, of a blueing dye. The blueing dye serves to increase the whiteness of the ink jet recording material. Suitable examples of such dyes include cobalt blue, copper phthalocyanine, metal-free phthalocyanine, oxide cobalt phosphate, dye complex salts (i.e., dyes precipitated with phosphomolybdic, phosphotungstic, phospho-molybdotungstic acids), quinacridone pigments, ultramarine blue and mixtures thereof. Preferred blueing dyes have good lightfastness and are available from: Ciba Specialty, under the product designations IRGALITE BLUE RL PST copper phthalocyanine dyestuff dispersion and IRGALITE VIOLET RM and IRGALITE RED B-FL arylamide pigment dispersions; and Bayer Industrial Chemicals, under the product designations PONOLITH RED WC quinacridone pigment dispersion and PONOLITH BLUE RDC copper phthalocyanine pigment dispersion.

It is noted that when both the optionally fluorescent whitening agent and the blueing dye are present in the coating formulation, the whitening agent/blueing dye weight ratio preferably ranges from about 1:1 to about 1000:1, and more preferably ranges from about 2:1 to about 800:1. If the whitening agent/blueing dye ratio falls below 1:1, the resulting ink jet recording material displays lower brightness and whiteness, and if the ratio exceeds 1000:1, the resulting recording materials demonstrates poor lightfastness.

In addition to the above components, the coating formulation of the present invention can advantageously contain other additives such as antioxidants, antistatic agents, crosslinking agents, defoaming agents, dispersing agents, fragrances, mold inhibitors, slip agents, UV absorbers and wetting agents. However, some such additives may adversely impact upon the desirable properties of the resulting ink jet receptive layer.

In a most preferred embodiment, the coating formulation used to prepare the ink jet receptive layer of the present invention comprises:

(1) from about 50 to about 75% by dry wt. of a pigment composition comprising:
  (a) from about 20 to about 80% by dry wt., based on the total dry weight of the pigment composition, of silica gel; and
  (b) from about 80 to about 20% by dry wt., based on the total dry weight of the pigment composition, of precipitated calcium carbonate,
(2) from about 15 to about 40% by dry wt. of a water-soluble binder comprising:
  (a) from about 20 to about 70% by dry wt., based on the total dry weight of the binder, of a super and/or fully hydrolyzed, medium molecular weight polyvinyl alcohol;
  (b) from about 70 to about 25% by dry wt., based on the total dry weight of the binder, of a partially hydrolyzed, medium-to-low molecular weight, polyvinyl alcohol; and
  (c) from about 5 to about 35% by dry wt., based on the total dry weight of the binder, of a cationic styrene acrylic copolymer,
(3) from about 3 to about 15% by dry wt. of polydiallyl dimethyl ammonium chloride,
(4) from about 0.01 to about 1.5% by dry wt. of a hexasulfonated stilbene derivative, and
(5) from about 0.001 to about 0.05% by dry wt. of a phthalocyanine dye stuff,
wherein, the binder/pigment composition weight ratio ranges from about 1:6 to about 1:1.5, and
wherein, the whitening agent/blueing dye weight ratio ranges from about 2:1 to about 800:1.

The ink jet receptive layer coating formulation is made by mixing the components with water so as to obtain an aqueous composition having a solids content ranging from about 15 to about 35% (preferably from about 15 to about 20%), based on the total dry weight of the coating formulation. The pH of the aqueous composition is between 6 and 10, and preferably is between 6.5 and 8.

In a preferred embodiment, the coating formulation is made by first preparing an aqueous solution or emulsion of the optionally fluorescent whitening agent and then by adding the remaining components in the following sequence: cationic resin (e.g., polydiallyl dimethyl ammonium chloride), first pigment (e.g., silica gel), second pigment (e.g., PCC), remaining ingredients or components. This sequence of addition is preferred where the cationic resin is somewhat incompatible with the optionally fluorescent whitening agent but aids in the dispersion of the first pigment.

In order to avoid degradation in ink absorptivity caused by the use of excessive amounts of coating, it is preferred that the ink jet coating composition of the present invention be applied so as to achieve an average coat weight that ranges from about 2 to about 14 g/m$^2$, based on the total dry weight of the coating composition.

Substrates useful in the present invention are coatable substrates, examples of which include, without limitation, paper, cardboard, corrugated board, plastic film, metal film, foil face stocks and label stocks.

The substrate preferably has a thickness ranging from about 50 to about 300μ, a basis weight ranging from about 40 to about 240 grams per square meter (g/m$^2$), a surface smoothness of from about 15 to about 150 Bekk seconds and a Cobb sizing of from about 25 to about 150 g/m$^2$.

The optional undercoat layer of the ink jet recording material of the present invention serves to reduce cockling and enhance or improve the whiteness, brightness, opacity, ink jet ink strike-through and lightfastness of the resulting ink jet recording material.

When an undercoat layer is employed, the amount of optionally fluorescent whitening agent in the undercoat layer is greater than the amount of whitening agent in the ink receptive layer.

The present inventor has discovered that by using quantities of whitening agents in an undercoat layer, where such quantities are greater than the quantities of whitening agents used in the overlying ink jet layer, the resulting recording material will demonstrate high brightness and whiteness and light or fade resistance. As will be readily evident to those skilled in the art, use of an undercoat layer in the present invention allows for the use of less expensive grades of substrates (e.g., base papers) where such substrates no longer have to satisfy rigid brightness/whiteness standards.

The coating formulation used to prepare the undercoat layer, comprises:
  (i) one or more pigments;
  (ii) one or more binders;
  (iii) optionally, one or more dispersing agents; and
  (iv) an effective amount of an optionally fluorescent whitening agent.

Pigments useful in the undercoat layer include materials that increase the opacity, and/or modify the porosity of the coated substrate. Inorganic pigments are especially preferred and include, without limitation, alumina (e.g., alumina trihydrate), salts of alkaline earth metals (e.g., sulfonates such as barium sulfate), clays, satin white, titanium oxide and the like.

Alumina pigments are described in detail above.

Salts of alkaline earth metals include sulfonates and carbonates such as barium sulfate, magnesium sulfate and calcium carbonate.

In a preferred embodiment, the coating formulation used to prepare the undercoat layer comprises from about 50 to about 95% by dry wt., based on the total dry weight of the coating formulation, of one or more inorganic pigments, and more preferably comprises from about 70 to about 90% by dry wt. of alumina trihydrate.

Binders suitable for use in the undercoat layer are water-soluble polymeric materials, examples of which include casein, cellulose derivatives, gelatin, polyvinyl alcohol, modified polyvinyl alcohol, latex, starch, starch derivatives, styrene-acrylic copolymers, ethylene-maleic anhydride copolymer and styrene-maleic anhydride copolymer.

Among the listed materials, polyvinyl alcohols are preferably used in the coating formulation.

Preferably, the binder is employed in the coating formulation at levels ranging from about 50 to about 5% by dry wt., more preferably from about 28 to about 7% by wt., based on the total dry weight of the coating formulation.

The pigment/binder ratio in the coating formulation used to prepare the undercoat layer ranges from about 1:1 to about 20:1, and preferably ranges from about 2.5:1 to about 13:1. The present inventor has found that if the pigment/binder ratio falls below 1:1, a reduction in brightness, whiteness, opacity and printed image quality results, while coating surface strength is reduced if the ratio exceeds 20:1.

Suitable dispersing agents include acrylic acid copolymer salts, aluminum stearate, calcium palmitate, polyphosphates such as sodium hexametaphosphate, sodium laurate, sodium palmitate, sodium stearate, etc. Preferred dispersing agents are acrylic acid copolymer salts, while more preferred dispersing agents are ammonium acrylic acid copolymer salts. These dispersing agents give good whiteness to the undercoat layer.

In a preferred embodiment, a dispersing agent is present in the coating formulation at a concentration ranging from about 0.5 to about 5% by dry wt., more preferably from about 1 to about 4% by wt., based on the total dry weight of the coating formulation.

Suitable optionally fluorescent whitening agents are described hereinabove. In a preferred embodiment, the coating formulation used to prepare the undercoat layer comprises from about 0.1 to about 1.5% by dry wt.), based on the total dry weight of the coating formulation, of an optionally fluorescent whitening agent, and preferably comprises from about 0.2 to about 1.0% by dry wt. of a stilbene fluorescent whitening agent.

In addition to the above components, the undercoat layer coating formulation of the present invention can advantageously contain other additives such as antioxidants, antistatic agents, cationic resins, crosslinking agents, defoaming agents, fragrances, inorganic dyestuffs, mold inhibitors, organic dyestuffs, slip agents, UV absorbers and wetting agents. However, some such additives may adversely impact upon the desirable properties of the resulting undercoat layer.

In a more preferred embodiment, the coating formulation used to prepare the undercoat layer of the present invention comprises:
  (i) from about 70 to about 90% by dry wt., based on the total dry weight of the coating formulation, of alumina trihydrate pigment;
  (ii) from about 7 to about 28% by dry wt., based on the total dry weight of the coating formulation, of polyvinyl alcohol copolymer;
  (iii) from about 1 to about 4% by dry wt., based on the total dry weight of the coating formulation, of an ammonium acrylic acid copolymer salt; and
  (iv) from about 0.2 to about 1.0% by dry wt., based on the total dry weight of the coating formulation, of a stilbene fluorescent whitening agent,
  wherein, the sum of the coating formulation components total 100% by wt., and
  wherein, the pigment/binder ratio in the undercoat layer ranges from about 2.5:1 to about 13:1.

The undercoat layer coating formulation is prepared by mixing the components with water so as to obtain an aqueous composition having a preferred solids content ranging from about 15 to about 50%, based on the total dry weight of the coating composition.

In a preferred embodiment, the undercoat layer coating formulation is made by adding each component to a quantity of water contained in a mixing tank in the order noted above, allowing sufficient time between additions to provide for complete mixing.

It is preferred that the undercoat layer coating composition be applied so as to achieve an average coat weight that ranges from about 2 to about 12 g/m$^2$, based on the total dry weight of the coating composition.

The ink jet recording material of the present invention may advantageously contain one or more backcoat layers. The backcoat layer(s), which serves to reduce the degree of cockling and curl in the recording material upon drying, is prepared using a coating formulation which comprises: a binder (e.g., polyvinyl alcohol) or a pigment/binder blend, and optionally other additives such as antioxidants, antistatic agents, cationic resins, crosslinking agents, defoaming agents, dispersing agents (e.g., acrylic acid copolymer salts), fragrances, inorganic dyestuffs, mold inhibitors, organic dyestuffs, slip agents, surfactants (e.g., octyl phenoxy ethanol), UV absorbers, wetting agents and fluorescent whitening agents.

In one embodiment, the coating formulation used to prepare the backcoat layer(s) is a non-pigmented coating composition, which comprises:
(i) from about 45 to about 95% by dry wt., based on the total dry weight of the coating formulation, of a polyvinyl alcohol binder;
(ii) from about 5 to about 30% by dry wt., based on the total dry weight of the coating formulation, of an acrylic acid copolymer salt dispersing agent; and
(iii) from about 5 to about 35% by dry wt., based on the total dry weight of the coating formulation, of an octyl phenoxy polyethoxy ethanol nonionic surfactant,
wherein, the sum of the coating formulation components total 100% by dry weight.

The subject composition is prepared by mixing the components with water so as to obtain an aqueous composition having a solids content ranging from about 1 to about 10% by dry wt., based on the total dry weight of the coating formulation. The formulation is applied so as to achieve an average coat weight that ranges from about 2 to about 14 g/m$^2$, based on the total dry weight of the coating formulation.

In a more preferred embodiment, the coating formulation is a pigmented formulation similar, if not identical, to that described above for use in preparing the undercoat layer. The aqueous coating formulation has a higher solids content ranging from about 20 to about 50% by wt., and is applied so as to achieve an average coat weight that ranges from about 3 to about 8 g/m$^2$.

As will be readily evident to those skilled in the art, pigmented backcoat layers serve to increase opacity, brightness and whiteness, in addition to, reducing or further reducing cockle and curl.

In yet a more preferred embodiment, the ink jet recording material of the present invention comprises an outer backcoat layer, which provides a surface for off-set printing.

A number of different layer constructions for the ink jet recording material of the present invention are contemplated, several of which are identified below:
(a) substrate/ink jet receptive layer(s) or (I);
(b) substrate/undercoat layer(s)/ink jet receptive layer(s) or (II);
(c) substrate/backcoat layer(s)/ink jet receptive layer(s) or (III);
(d) substrate/undercoat layer(s)/backcoat layer(s)/ink jet receptive layers(s) or (IV);
(e) substrate/backcoat layer(s)/undercoat layer(s)/ink jet receptive layer(s) or (V);
(f) backcoat layer(s)/(I), (II), (III), (IV) or (V);
(g) ink jet receptive layer(s)/(I), (II), (III), (IV) or (V);
(h) ink jet receptive layer(s)/undercoat layer(s)/(I), (II), (III), (IV) or (V);
(i) ink jet receptive layer(s)/backcoat layer(s)/(I), (II), (III), (IV) or (V);
(j) ink jet receptive layer(s)/backcoat layer(s)/undercoat layer(s)/(I), (II), (III), (IV) or (V); and
(k) ink jet receptive layer(s)/undercoat layer(s)/backcoat layer(s)/(I), (II), (III), (IV) or (V).

The aqueous coating formulations of the present invention may be applied using e.g., air knife coaters, rod coaters or gravure coaters. Drying can be accomplished by any known method or technique including room temperature air drying, hot air drying, heating surface-contact drying or heat radiation drying.

The ink jet recording material of the present invention demonstrates good printability and provides images having excellent water and humidity resistance and high image densities.

In a more preferred embodiment of the present invention, the ink jet recording material has high background brightness and whiteness, demonstrates good printability and good light or fade resistance and provides images having excellent water and humidity resistance and high image densities.

The subject invention will now be described by reference to the following illustrative examples. The examples are not, however, intended to limit the generally broad scope of the present invention.

SPECIFIC EMBODIMENT

Part A

In the working examples set forth below, the following components were used:

| | |
|---|---|
| SILICA GEL | a silica gel having a pore volume of 1.2 cc/g and an average particle size of 5.3μ marketed by Grace Davison under the trade designation SYLOID 74 × 6500 silica gel. |
| PCC | a precipitated calcium carbonate pigment marketed by Minerals Technologies Inc. under the trade designation JETCOAT 30 precipitated calcium carbonate. |
| PIGMENT | an alumina trihydrate pigment marketed by Alcan Chemicals, a division of Alcan Aluminum Corporation, 3690 Orange Place, Suite 400, Cleveland, |

|  | -continued |
|---|---|
|  | OH 44122, under the trade designation GENBRITE 700 alumina trihydrate pigment. |
| BINDER | a blend of the following components:<br>1. 39.80% by wt. (dry) of a super hydrolyzed, medium viscosity polyvinyl alcohol marketed by Air Products under the trade designation AIRVOL 125 polyvinyl alcohol;<br>2. 35.40% by wt. (dry) of a partially hydrolyzed, medium viscosity polyvinyl alcohol marketed by Air Products under the trade designation AIRVOL 523 polyvinyl alcohol;<br>3. 7.08% by wt. (dry) of a partially hydrolyzed, low viscosity polyvinyl alcohol marketed by Air Products under the trade designation AIRVOL 205 polyvinyl alcohol;<br>4. 17.70% by wt. (dry) of a cationic starch marketed by National Starch and Chemical Co., 10 Finderne Ave., P.O. Box 6500, Bridgewater, N.J. 08807 under the trade designation CATO SIZE 240A cationic starch; and<br>5. 0.02% by wt. (dry) of a biocide marketed by Calgon Corporation, under the trade designation TEKTAMER 38 LV 1,2-dibromo-2,4-dicyanobutane aqueous dispersion.<br>The BINDER was prepared by: adding the above-identified components, in solid form, to a mixing tank containing water; heating the resulting mixture, by steam injection, to approximately 96° C.; maintaining that temperature for 30 minutes; cooling the mixture to a temperature below 38° C.; and then adjusting the solids content to about 10% by wt. |
| CATIONIC ACRYLIC RESIN | a cationic styrene-acrylic copolymer water-based emulsion supplied at 40% solids, marketed by Westvaco Corporation, under the trade designations TRUDOT P2605 cationic styrene-acrylic copolymers. |
| CATIONIC RESIN | a quaternary ammonium polymer (poly(dimethyldiallylammonium chloride)) supplied as a water-based solution at 33.5% solids, marketed by Calgon Corporation under the trade designation CP-1030 quaternary ammonium polymer. |
| FWA | a stilbene fluorescent whitening agent supplied as a water-based solution at 29% solids, marketed by Ciba Specialty Chemicals Corporation, North America, 4090 Premier Drive, High Point, NC 27261, under the trade designation TINOPAL ABP-A stilbene fluorescent whitening agent. |
| BLUEING DYE I | a water-based blueing pigment dye marketed by Ciba Specialty Chemicals Corporation, under the trade designation IRGALITE BLUE RL water-based blueing pigment dye. |
| BLUEING DYE II | a water-based blueing pigment mixture dye marketed by Ciba Specialty Chemicals Corporation, under the trade designation IRGALITE BLUE RM water-based blueing pigment mixture dye. |
| WETTING AGENT | an ethoxylated acetylenic diol surfactant marketed by Air Products under the trade designation SURFYNOL 465 ethoxylated acetylenic diol surfactant. |
| DISPERSING AGENT | an ammonium salt of an acrylic acid copolymer marketed by BYK-Chemie USA, 524 South Cherry Street, Wallingford, Connecticut 06492, under the trade designation BYK 156 aqueous solution of an ammonium acrylic acid copolymer. |
| FRAGRANCE | a water soluble fragrance marketed by Technology Flavors & Fragrances, Inc., 10-T Edison Street East, Amityville, NY 11701-2814, under the trade designation 119-043C water soluble Fresh Fragrance. |

Sample Preparation and Test Methods

1. Preparation of Aqueous Coating Formulation for Undercoat Layer.

An aqueous coating formulation for use in making the undercoat layer was prepared by adding the following components to a mixing tank in the quantities and in the order specified. The mixing tank contained 136 parts of tap water per 100 parts of dry components.

3.28% by wt. (dry) DISPERSING AGENT;

81.89% by wt. (dry) PIGMENT;

14.37% by wt. (dry) BINDER;

0.32% by wt. (dry) FWA;

0.12% by wt. (dry) FRAGRANCE; and 0.02% by wt. (dry) WETTING AGENT.

The water in the mixing tank was agitated during the addition of each component. Upon the addition of the last component, water was added to the resulting coating formulation so as to achieve a solids content of 18.7%. The coating formulation was then filtered through a 100 mesh shaker screen. The temperature of the coating formulation was maintained between 20 and 30° C.

2. Formation of Undercoat Layer.

The aqueous coating formulation was then applied to base papers having either (1) a basis weight of 90 g/m$^2$, a thickness of 4.7 mil and a Cobb sizing of less than 100 g/m$^2$ (premium CAD grade base paper), or (2) a basis weight of 120 g/m$^2$, a thickness of 6.4 mil and a Cobb sizing of less than 100 g/m$^2$ (premium graphics grade base paper). The coating composition was applied by means of an air knife coater so as to achieve a coat weight of 4.5 g/m$^2$. The coated paper was then dried.

3. Preparation of Aqueous Coating Formulations for Ink Jet Receptive Layers.

Aqueous coating formulations for use in making the ink jet receptive layers were prepared by adding the components identified below in Table 1, to a mixing tank in the quantities and in the order specified. The parts of tap water per 100 parts of dry components present in the mixing tank are identified below in Table 1, as PW×100PDC.

TABLE 1

Coating Formulations Used for Ink Jet Receptive Layers

| | Examples | | | | | |
|---|---|---|---|---|---|---|
| | 1 to 15 | C-6 | C-7 | C-8 | C-9 | C-10 |
| PWx100PDC | 115 | 15 | 225 | 305 | 175 | 385 |
| FWA | 0.177 | 0.177 | 0.177 | 0.177 | 0.177 | 0.177 |
| CATIONIC RESIN | 4.932 | 4.932 | 4.932 | 4.932 | 4.932 | 4.932 |
| SILICA GEL | 34.507 | — | 66.304 | 66.304 | 66.304 | 66.304 |
| PCC | 31.797 | 66.304 | — | — | — | — |
| BINDER | 21.376 | 21.376 | 21.376 | 10.688 | 28.400 | — |
| CATIONIC ACRYLIC RESIN | 7.024 | 7.024 | 7.024 | 3.512 | — | 28.400 |
| BLUEING DYE I | 0.0043 | 0.0043 | 0.0043 | 0.0043 | 0.0043 | 0.0043 |
| BLUEING DYE II | 0.0007 | 0.0007 | 0.0007 | 0.0007 | 0.0007 | 0.0007 |
| FRAGRANCE | 0.129 | 0.129 | 0.129 | 0.129 | 0.129 | 0.129 |
| WETTING AGENT | 0.053 | 0.053 | 0.053 | 0.053 | 0.053 | 0.053 |

For each formulation, the FWA, CATIONIC RESIN and/or SILICA GEL components were added to the mixing tank while the water contained within the tank was being agitated. Mixing was continued for 25 to 35 minutes and then the remaining components were added, in the order shown. Water was added to the resulting formulation so as to achieve a solids content of 18%. The temperature of each coating formulation was maintained between 20 and 30° C.

4. Formation of the Ink Jet Receptive Layer.

The aqueous coating formulations were then applied either directly to a base paper or to the previously prepared coated base papers by means of a Meyer rod #20 or an air knife coater so as to achieve a coat weight of 8 g/m². The coated papers were then dried and calendared so as to achieve a smoothness in the range of 25 to 70 Bekk seconds.

Test Methods

The coated ink jet papers were then subjected to several evaluation tests. Wide format printers manufactured by Encad, Inc., 6059 Cornerstone Court West, San Diego, Calif. 92121, and Hewlett Packard Co., 8000 Foothills Boulevard, Roseville, Calif. 95747, and sold under the trade designations NOVAJET 630 and HP 2500 CP, respectively, were used in conjunction with these tests. The printers were used to print images on the coated ink jet papers using seven colors, namely—black, magenta, red, yellow, purple, green and cyan. The NOVAJET 630 printer was set at premium matte, 100 gram, paper mode, Encad GS+ ink, ten pass (best) quality mode, stochastic dot pattern (600 dpi), while the HP 2500 CP printer was set at coated paper mode, HP dye ink, eight pass quality (enhanced) varware mode, bi-directional, stochastic dot pattern (600 dpi), prior to printing images on the coated papers.

Commercial ink jet recording materials, which are identified below, were also tested for comparison purposes.

Commercial Papers

| | |
|---|---|
| COMM 1 | a premium coated matte commercial ink jet recording material sold by Rexam Image Products, 28 Gaylord Street, South Hadley, MA 01075, under the product designation Rexam DMPG 132 presentation grade matte paper (132 grams). |
| COMM 2 | a premium coated matte commercial ink jet recording material sold by Rexam Image Products under the product designation Rexam DMPG 150 presentation grade matte paper (150 grams). |
| COMM 3 | a coated matte commercial ink jet recording material sold by Rexam Image Products under the product designation Rexam JS024 24 lb. (90 gram) premium coated bond. |
| COMM 4 | a coated matte commercial ink jet recording material sold by Azon Corporation, 720 Azon Road, Johnson City, NY 13790, under the product designation AZON 715 24 lb. color bond. |
| COMM 5 | a premium coated matte commercial ink jet recording material sold by Azon Corporation, under the product designation AZON 748 40 lb. heavyweight premium. |

The tests and standards used to evaluate the coated ink jet papers or test specimens and the Commercial Papers are described below.

Image Density

Image density is basically a measurement of the amount of light reflected by a sample. Image density is referred to as either optical density, color density or image density. Black, magenta, red, yellow, purple, green and cyan color densities were measured with an X-RITE 418 color densitometer, which is sold by X-Rite Corporation, 3100 44th Street Southwest, Grandville, Mich. 49418. Generally, in this test, a higher image density value denotes a higher strength of the measured color. A low image density may indicate either excessive dot gain control or penetration of the inks into the substrate.

Lightfastness (Background Light Stability)

Lightfastness refers to the durability or fade resistance of a coated paper when exposed to ultraviolet light. For this test, the coated test specimens and the Commercial Papers were tested for brightness, whiteness and yellowness using a TECHNIBRITE MICRO TD 1C brightness meter, which is sold by Technidyne Corporation, 100 Quality Avenue, New Albany, N.Y. 47150, and the values recorded. L,a,b values were also determined and recorded. L,a,b values constitute a series of coordinates obtained from a calorimeter which describe any color as a set of three values. The "L" coordinate designates a value from light to dark, the "a" coordinate designates a value from red to green and the "b" coordinate designates a value from blue to yellow. These three numbers position any color in the 3 axis area and allows a comparison to be made to match any particular color standard.

The coated test specimens and the Commercial Papers were then exposed to ultraviolet light (irradiance=0.35 W/m² at 340 nanometers) for 15 hours using an ATLAS fadeometer, model no. CI 3000, which is sold by Atlas Electric Devices Company, 4114 North Ravenswood Avenue, Chicago, Ill. 60613, and brightness, whiteness and L,a,b values re-measured and recorded for each exposed sample.

ΔE values were then determined using the following equation:

$$\Delta E = ((L_{initial} - L_{UV\ exposed})^2 + (a_{initial} - a_{UV\ exposed})^2 + (b_{initial} - b_{UV\ exposed})^2)^{0.5}$$

For this test, exposed test specimens and Commercial Papers having brightness values of greater than 88.5, whiteness values of greater than 92, b values of less than −1.8 and ΔE values of less than 3.5, were considered to have good lightfastness or background light stability.

It is noted that unexposed test specimens demonstrated average brightness values of greater than 93 average, whiteness values of greater than 112 and average b values of less than −5.

Waterfastness

Waterfastness refers to the resistance of an ink jet image to dilution or removal by water. In a waterfast, coated paper, inks have a reduced tendency to wick or feather. The coated test specimens and the Commercial Papers were tested for waterfastness by (1) printing each test specimen and Commercial Paper with either the NOVAJET 630 printer or the HP 2500 CP printer, (2) measuring and recording the image densities of each color (i.e., black, magenta, red, yellow, purple, green and cyan) imaged on the printed samples, (3) immersing each printed sample in tap water for five minutes, (4) removing excess water from each sample using a paper towel, (5) drying each sample by placing the sample in a convection oven set at 110° C. for three minutes, and (6) re-measuring and recording color densities for each printed test specimen and Commercial Paper.

Humidity Resistance

The resistance of ink jet images to dilution or removal under high relative humidity conditions was determined by (1) printing each test specimen and Commercial Paper with either the NOVAJET 630 printer or the HP 2500 CP printer, (2) measuring and recording the image densities of each color imaged on the printed samples, (3) storing the printed samples in an atmosphere having a temperature of 40° C. and a relative humidity (RH) of 90% for 24 hours, (4) measuring and recording the remaining image densities of the imaged colors on each printed test specimen and Commercial Paper and (5) determining % change in image densities using the following equation:

$$\%\ Change = (Image\ Density_{Exposed\ to\ 40°\ C.,\ 90\%\ RH} / Image\ Density_{initial}) \times 100$$

Low percentage Image Density changes (i.e., less than or equal to 110%) for each imaged color indicated good relative humidity stability or resistance.

EXAMPLES 1 TO 2 AND COMPARATIVE EXAMPLES C-1 TO C-5

In these examples, the premium graphics grade (6.5 mil paper) and premium CAD grade (4.8 mil paper) coated ink jet papers of the present invention and the Commercial Papers identified above, were evaluated for lightfastness. The results are set forth in Table 2, hereinbelow.

TABLE 2

Summary of Examples 1 to 2 and Comparative Examples C-1 to C-5

| | Example | | | | | | | | | | | | | |
|---|---|---|---|---|---|---|---|---|---|---|---|---|---|---|
| | 1 6.5 mil paper | | C-1 COMM 1 | | C-2 COMM 2 | | C-3 COMM 5 | | 2 4.8 mil paper | | C-4 COMM 3 | | C-5 COMM 4 | |
| Brightness (initial)/ (after UV) | 94.26 | 89.81 | 93.56 | 88.54 | 92.74 | 88.61 | 92.4 | 89.3 | 93.6 | 89.06 | 95.54 | 89.73 | 93.91 | 87.1 |

TABLE 2-continued

Summary of Examples 1 to 2 and Comparative Examples C-1 to C-5

| | Example | | | | | | | | | | | | | |
|---|---|---|---|---|---|---|---|---|---|---|---|---|---|---|
| | 1<br>6.5 mil paper | | C-1<br>COMM 1 | | C-2<br>COMM 2 | | C-3<br>COMM 5 | | 2<br>4.8 mil paper | | C-4<br>COMM 3 | | C-5<br>COMM 4 | |
| L/afterFAD | 94.6 | 94.49 | 93.18 | 94.21 | 94.84 | 94.77 | 94.28 | 94.46 | 94.31 | 94.19 | 95.11 | 95.5 | 94.25 | 94.7 |
| a | 2.01 | 0.74 | 2.87 | 1.78 | 1.24 | 0.73 | 1.84 | 1.29 | 1.76 | 0.67 | 2.51 | 1.15 | 2.64 | 1.03 |
| b | −5.23 | −2.18 | −6.94 | −1.81 | −3.55 | −0.71 | −4.18 | −1.72 | −5.12 | −2.0 | −4.44 | −.5 | −5.48 | .18 |
| Whiteness<br>(initial)/<br>(afterUV) | 116 | 98.39 | 121.66 | 95.63 | 107.05 | 90.99 | 109.09 | 95.77 | 114.6 | 96.65 | 112.92 | 91.58 | 116.41 | 85.91 |
| Yellowness<br>(initial)/<br>(after UV) | −8.45 | −3.46 | −11.48 | −2.88 | −5.68 | −1.12 | −6.74 | −2.73 | −8.3 | −3.19 | −7.12 | −0.78 | −8.9 | 0.29 |
| Opacity | 97.6 | | 97.6 | | 96.1 | | 97 | | 95.4 | | 93.6 | | 94.7 | |
| Δ E | 3.31 | | 5.34 | | 2.89 | | 2.53 | | 3.31 | | 4.19 | | 5.90 | |

As shown in Table 2 above, Example 1 (6.5 mil paper) and Example 2 (4.8 mil paper) of the present invention demonstrated improved lightfastness (i.e., higher levels of brightness and whiteness after UV exposure, lower b values, generally lower ΔE values) as compared to Comparative Examples C-1 to C-3 and C-4 to C-5, respectively.

EXAMPLE 3 AND COMPARATIVE EXAMPLES C-6 TO C-10

In these examples, changes were made in the coating formulation used to prepare the ink jet receptive layer. The coating formulation changes are identified in Table 1, hereinabove. The resulting coated papers, which were prepared using 6.4 mil base papers, were then imaged using either an HP 2500 CP or NOVAJET 630 wide format printer and the image densities of the formed images measured and recorded. The results are set forth in Table 3, hereinbelow.

TABLE 3

Summary of Example 3 and Comparative Examples C-6 to C-10

| | Example | | | | | |
|---|---|---|---|---|---|---|
| Image<br>Densities | 3<br>6.9 mil<br>paper | C-6<br>6.9 mil<br>paper | C-7<br>6.9 mil<br>paper | C-8<br>6.9 mil<br>paper | C-9<br>6.9 mil<br>paper | C-10<br>7.0 mil<br>paper |
| HP 2500 CP | | | | | | |
| Black | 1.60 | 1.49 | 1.56 | 1.51 | 1.49 | 1.49 |
| Magenta | 1.46 | 1.41 | 1.45 | 1.41 | 1.36 | 1.38 |
| Red | 1.42 | 1.39 | 1.45 | 1.35 | 1.37 | 1.35 |
| Yellow | 0.83 | 0.87 | 0.81 | 0.79 | 0.78 | 0.77 |
| Purple | 1.59 | 1.47 | 1.56 | 1.52 | 1.48 | 1.45 |
| Green | 1.56 | 1.21 | 1.55 | 1.49 | 1.47 | 1.43 |
| Cyan | 1.57 | 1.24 | 1.54 | 1.48 | 1.45 | 1.40 |
| NOVAJET 630 | | | | | | |
| Black | 1.77 | 1.61 | 1.69 | 1.56 | 1.57 | 1.41 |
| Magenta | 1.41 | 1.29 | 1.25 | 1.16 | 1.13 | 1.10 |
| Red | 1.41 | 1.38 | 1.31 | 1.20 | 1.19 | 1.24 |
| Yellow | 0.96 | 1.01 | 0.89 | 0.81 | 0.82 | 0.84 |
| Purple | 1.49 | 1.18 | 1.50 | 1.36 | 1.38 | 1.36 |
| Green | 1.40 | 1.09 | 1.31 | 1.03 | 1.08 | 1.00 |
| Cyan | 1.37 | 0.96 | 1.30 | 1.05 | 1.11 | 0.95 |

Images recorded on the ink jet recording material of the present invention (i.e., Example 3), demonstrated higher image densities for a majority of the colors tested. Images recorded on Comparative Examples C-6 and C-7, which employed only PCC or SILICA GEL as the pigment component, generally demonstrated reduced optical densities. It is noted that the optical density results for Example 3 are greater than the results predicted for this test specimen based on both the weight averages of the pigment components, and the results obtained for Comparative Examples C-6 and C-7.

Comparing the optical density results obtained for Comparative Examples C-7 and C-8, it becomes apparent that reducing the binder concentration in C-8 to about 60% of the binder level in C-7 results in a marked reduction in optical densities.

Images recorded on Comparative Examples C-9 and C-10, which employed only SILICA GEL as the pigment component and either blends of PVAs and STARCH or CATIONIC ACRYLIC RESIN as the binder, demonstrated reduced image densities. It is noted that the optical density results for Example 3 are once again greater than the results predicted for this test specimen based on both the weight averages of the pigment and binder components and the results obtained for Comparative Examples C-9 and C-10.

EXAMPLES 4 AND 5 AND COMPARATIVE EXAMPLES C-11 TO C-16

In these examples, the premium graphics grade (6.5 mil paper) coated ink jet papers of the present invention and three of the Commercial Papers identified above, were evaluated for lightfastness and waterfastness. The results are set forth in Table 4, hereinbelow.

TABLE 4

Summary of Examples 4 and 5 and
Comparative Examples C-11 to C-16

| HP 2500CP | Example 4 6.5 mil paper | C-11 COMM 1 | C-12 COMM 2 | C-13 COMM 5 | NOVAJET 630 | Example 5 6.5 mil paper | C-14 COMM 1 | C-15 COMM 2 | C-16 COMM 5 |
|---|---|---|---|---|---|---|---|---|---|
| Image Density Initial | | | | | Image Density Initial | | | | |
| Black | 1.55 | 1.44 | 1.68 | 1.65 | Black | 1.54 | 1.52 | 1.65 | 1.6 |
| Magenta | 1.4 | 1.34 | 1.51 | 1.51 | Magenta | 1.46 | 1.51 | 1.66 | 1.63 |
| Red | 1.41 | 1.3 | 1.49 | 1.5 | Red | 1.48 | 1.48 | 1.71 | 1.64 |
| Yellow | 0.8 | 0.8 | 0.78 | 0.78 | Yellow | 0.98 | 1.02 | 1.15 | 1.13 |
| Purple | 1.6 | 1.36 | 1.52 | 1.52 | Purple | 1.53 | 1.53 | 1.78 | 1.69 |
| Green | 1.55 | 1.32 | 1.58 | 1.56 | Green | 1.15 | 1.21 | 1.43 | 1.36 |
| Cyan | 1.48 | 1.35 | 1.63 | 1.63 | Cyan | 1.11 | 1.18 | 1.45 | 1.33 |
| Light-fastness | | | | | Light-fastness | | | | |
| Black | 1.5 | 1.43 | 1.47 | 1.43 | Black | 1.33 | 1.38 | 1.35 | 1.34 |
| Magenta | 1.3 | 1.28 | 1.4 | 1.39 | Magenta | 1.08 | 1.11 | 0.41 | 0.43 |
| Red | 1.3 | 1.2 | 1.39 | 1.38 | Red | 1.15 | 1.21 | 0.75 | 0.74 |
| Yellow | 0.79 | 0.69 | 0.75 | 0.75 | Yellow | 0.65 | 0.82 | 0.41 | 0.39 |
| Purple | 1.57 | 1.37 | 1.33 | 1.32 | Purple | 1.33 | 1.39 | 1.01 | 0.97 |
| Green | 1.46 | 1.32 | 1.14 | 1.1 | Green | 1.11 | 1.19 | 1.01 | 1 |
| Cyan | 1.43 | 1.34 | 1.13 | 1.1 | Cyan | 1.07 | 1.17 | 0.96 | 0.93 |
| Water-fastness | | | | | Water-fastness | | | | |
| Black | 1.52 | 1.52 | 0.84 | 0.84 | Black | 1.52 | 1.58 | 1.37 | 1.36 |
| Magenta | 1.35 | 1.35 | 1.07 | 1.04 | Magenta | 1.4 | 1.54 | 1.29 | 1.25 |
| Red | 1.35 | 1.38 | 1.05 | 1.05 | Red | 1.41 | 1.5 | 1.28 | 1.24 |
| Yellow | 0.81 | 0.83 | 0.55 | 0.57 | Yellow | 0.92 | 0.94 | 1.23 | 1.17 |
| Purple | 1.61 | 1.44 | 1.19 | 1.14 | Purple | 1.47 | 1.52 | 1.28 | 1.26 |
| Green | 1.54 | 1.39 | 1.06 | 1.02 | Green | 1.22 | 1.23 | 1.03 | 0.98 |
| Cyan | 1.52 | 1.38 | 0.96 | 0.9 | Cyan | 1.19 | 1.18 | 0.99 | 0.94 |

It is initially noted that the densities shown in Table 4 for Example 4 and 5 of the present invention, which were manufactured pursuant to a first machine trial, are somewhat lower than the densities shown for Example 3 in Table 2, which was prepared in the laboratory. Nonetheless, images formed on Example 4 using an HP 2500CP wide format printer, demonstrated higher initial image densities than Comparative Example C-11. Moreover, Examples 4 and 5 outperformed Comparative Examples C-12 and C-13, and C-15 and C-16, respectively, in terms of lightfastness and waterfastness.

EXAMPLES 6 AND 7 AND COMPARATIVE EXAMPLES C-17 TO C-22

In these examples, the premium graphics grade (6.5 mil paper) coated ink jet paper of the present invention and three of the Commercial Papers identified above, were evaluated for humidity resistance. The results are set forth in Table 5, hereinbelow.

TABLE 5

Summary of Examples 6 and 7 and
Comparative Examples C-17 to C-22

| HP 2500 CP | Example 6 6.5 mil paper | C-17 COMM 1 | C-18 COMM 2 | C-19 COMM 5 | NOVAJET630 | Example 7 6.5 mil paper | C-20 COMM 1 | C-21 COMM 2 | C-22 COMM 5 |
|---|---|---|---|---|---|---|---|---|---|
| Image Density Initial | | | | | Image Density Initial | | | | |
| Black | 0.94 | 0.93 | 1.04 | 1.05 | Black | 0.96 | 0.94 | 1 | 0.96 |
| Magenta | 0.91 | 0.85 | 0.94 | 0.94 | Magenta | 1.05 | 1.23 | 1.31 | 1.34 |
| Red | 1.02 | 1.05 | 1.03 | 1.02 | Red | 1.15 | 1.3 | 1.39 | 1.39 |
| Yellow | 0.59 | 0.61 | 0.56 | 0.58 | Yellow | 0.7 | 0.77 | 0.86 | 0.97 |

TABLE 5-continued

Summary of Examples 6 and 7 and Comparative Examples C-17 to C-22

| | Example | | | | | Example | | | |
|---|---|---|---|---|---|---|---|---|---|
| HP 2500 CP | 6<br>6.5 mil paper | C-17<br>COMM 1 | C-18<br>COMM 2 | C-19<br>COMM 5 | NOVAJET630 | 7<br>6.5 mil paper | C-20<br>COMM 1 | C-21<br>COMM 2 | C-22<br>COMM 5 |
| Purple | — | — | — | — | Purple | — | — | — | — |
| Green | 1.04 | 0.99 | 1.13 | 1.14 | Green | 0.85 | 0.92 | 1.05 | 1.13 |
| Cyan | 0.99 | 0.94 | 1.09 | 1.09 | Cyan | 0.83 | 0.86 | 1.11 | 1.13 |
| 40° C., 90% RH | | | | | 40° C., 90% RH | | | | |
| Black | 0.96 | 0.97 | 1.23 | 1.25 | Black | 1.01 | 1.01 | 1.4 | 1.4 |
| Magenta | 0.93 | 0.81 | 1.12 | 1.11 | Magenta | 1.1 | 1.27 | 1.46 | 1.45 |
| Red | 1.02 | 1.04 | 1.13 | 1.13 | Red | 1.15 | 1.31 | 1.48 | 1.48 |
| Yellow | 0.61 | 0.63 | 0.66 | 0.66 | Yellow | 0.79 | 0.82 | 0.96 | 0.98 |
| Purple | — | — | — | — | Purple | — | — | — | — |
| Green | 1.04 | 0.99 | 1.17 | 1.17 | Green | 0.86 | 0.93 | 1.13 | 1.16 |
| Cyan | 1.01 | 0.96 | 1.19 | 1.19 | Cyan | 0.85 | 0.88 | 1.2 | 1.22 |
| % Change | | | | | % Change | | | | |
| Black | 102.1 | 104.3 | 118.3 | 119.0 | Black | 105.2 | 107.4 | 140.0 | 145.8 |
| Magenta | 102.2 | 95.3 | 119.1 | 118.1 | Magenta | 104.8 | 103.3 | 111.5 | 108.2 |
| Red | 100.0 | 99.0 | 109.7 | 110.8 | Red | 100.0 | 100.8 | 106.5 | 106.5 |
| Yellow | 103.4 | 103.3 | 117.9 | 113.8 | Yellow | 112.9 | 106.5 | 111.6 | 101.0 |
| Purple | — | — | — | — | Purple | — | — | — | — |
| Green | 100.0 | 100.0 | 103.5 | 102.6 | Green | 101.2 | 101.1 | 107.6 | 102.7 |
| Cyan | 102.0 | 102.1 | 109.2 | 109.2 | Cyan | 102.4 | 102.3 | 108.1 | 108.0 |

As shown in Table 5, images recorded on Examples 6 and 7 of the present invention and on Comparative Examples C-17 and C-20, demonstrated good humidity resistance throughout the color gamut tested. Images recorded on Comparative Examples C-18, C-19, C-21, and C-22, on the other hand, demonstrated poor humidity resistance for at least one color. As such, the humidity resistance of these samples was considered poor since a significant change in image density would be expected in halftone areas.

EXAMPLES 8 TO 11 AND COMPARATIVE EXAMPLES C-23 TO C-26

In these examples, two embodiments of the premium CAD grade (4.7, 4.8 mil) coated ink jet papers of the present invention and two of the Commercial Papers identified above, were evaluated for lightfastness and waterfastness. The results are set forth in Table 6, hereinbelow.

TABLE 6

Summary of Examples 8 to 11 and Comparative Examples C-23 to C-26

| | Example | | | | | Example | | | |
|---|---|---|---|---|---|---|---|---|---|
| HP 2500 CP | 8<br>4.8 mil paper | 9<br>4.7 mil paper | C-23<br>COMM 3 | C-24<br>COMM 4 | NOVAJET 630 | 10<br>4.7 mil paper | 11<br>4.7 mil paper | C-25<br>COMM 3 | C-26<br>COMM 4 |
| Image Density Initial | | | | | Image Density Initial | | | | |
| Black | 1.6 | 1.62 | 1.54 | 1.36 | Black | 1.64 | 1.66 | 1.57 | 1.33 |
| Magenta | 1.46 | 1.47 | 1.45 | 1.27 | Magenta | 1.51 | 1.52 | 1.61 | 1.42 |
| Red | 1.5 | 1.43 | 1.55 | 1.2 | Red | 1.52 | 1.49 | 1.62 | 1.35 |
| Yellow | 0.83 | 0.84 | 0.86 | 0.74 | Yellow | 1.01 | 0.99 | 1.1 | 0.99 |
| Purple | 1.62 | 1.57 | 1.56 | 1.21 | Purple | 1.56 | 1.54 | 1.67 | 1.43 |
| Green | 1.58 | 1.51 | 1.35 | 1.26 | Green | 1.25 | 1.26 | 1.3 | 1.18 |
| Cyan | 1.54 | 1.55 | 1.3 | 1.34 | Cyan | 1.19 | 1.15 | 1.26 | 1.16 |
| Light-fastness | | | | | Light-fastness | | | | |
| Black | 1.54 | 1.55 | 1.48 | 1.35 | Black | 1.4 | 1.44 | 1.36 | 1.2 |
| Magenta | 1.36 | 1.37 | 1.3 | 1.2 | Magenta | 1.1 | 1.12 | 0.81 | 1.25 |
| Red | 1.35 | 1.3 | 1.29 | 1.17 | Red | 1.18 | 1.19 | 1.12 | 1.2 |
| Yellow | 0.81 | 0.83 | 0.69 | 0.72 | Yellow | 0.67 | 0.67 | 0.63 | 0.92 |

TABLE 6-continued

Summary of Examples 8 to 11 and
Comparative Examples C-23 to C-26

| HP 2500 CP | Example 8 4.8 mil paper | 9 4.7 mil paper | C-23 COMM 3 | C-24 COMM 4 | NOVAJET 630 | Example 10 4.7 mil paper | 11 4.7 mil paper | C-25 COMM 3 | C-26 COMM 4 |
|---|---|---|---|---|---|---|---|---|---|
| Purple | 1.59 | 1.56 | 1.42 | 1.17 | Purple | 1.36 | 1.33 | 1.37 | 1.3 |
| Green | 1.49 | 1.45 | 1.29 | 1.21 | Green | 1.18 | 1.22 | 1.27 | 1.11 |
| Cyan | 1.48 | 1.51 | 1.28 | 1.31 | Cyan | 1.17 | 1.11 | 1.24 | 1.13 |
| Water-fastness | | | | | Water-fastness | | | | |
| Black | 1.55 | 1.56 | 1.55 | 0.89 | Black | 1.57 | 1.61 | 1.68 | 0.8 |
| Magenta | 1.35 | 1.39 | 1.48 | 0.68 | Magenta | 1.43 | 1.44 | 1.64 | 0.56 |
| Red | 1.35 | 1.39 | 1.48 | 0.78 | Red | 1.41 | 1.44 | 1.62 | 0.65 |
| Yellow | 0.81 | 0.82 | 0.82 | 0.64 | Yellow | 0.92 | 0.99 | 1.07 | 0.12 |
| Purple | 1.65 | 1.59 | 1.54 | 0.82 | Purple | 1.46 | 1.47 | 1.64 | 0.73 |
| Green | 1.56 | 1.53 | 1.27 | 0.91 | Green | 1.28 | 1.26 | 1.33 | 0.76 |
| Cyan | 1.52 | 1.58 | 1.28 | 1 | Cyan | 1.19 | 1.24 | 1.25 | 0.66 |

As shown in Table 6, images recorded on Example 8, which contained both an undercoat and an ink jet receptive layer, and on Example 9, which contained only an ink jet receptive layer, generally demonstrated higher initial image densities, better lightfastness and better or similar degrees of waterfastness when compared to the images formed on Comparative Examples C-23 and C-24.

Images recorded on Example 10, which contained both an undercoat and an ink jet receptive layer, and on Example 11, which contained only an ink jet receptive layer, demonstrated higher initial image densities and better waterfastness when compared to the images on Comparative Example C-26.

EXAMPLES 12 TO 15 AND COMPARATIVE EXAMPLES C-27 TO C-30

In these examples, two embodiments of the premium CAD grade (4.6, 4.8 mil paper) coated ink jet papers of the present invention and two of the Commercial Papers identified above, were evaluated for humidity resistance. The results are set forth in Table 7, hereinbelow.

TABLE 7

Summary of Examples 12 to 15 and
Comparative Examples C-27 to C-30

| HP 2500 CP | Example 12 4.8 mil paper | 13 4.6 mil paper | C-27 COMM 3 | C-28 COMM 4 | NOVAJET 630 | Example 14 4.8 mil paper | 15 4.6 mil paper | C-29 COMM 3 | C-30 COMM 4 |
|---|---|---|---|---|---|---|---|---|---|
| Image Density Initial | | | | | Image Density Initial | | | | |
| Black | 0.98 | 1.02 | 0.96 | 0.87 | Black | 1.02 | 1.24 | 1.23 | 0.87 |
| Magenta | 0.92 | 0.97 | 0.93 | 0.82 | Magenta | 1.12 | 1.25 | 1.34 | 1.1 |
| Red | 1.05 | 1.07 | 1.05 | 0.92 | Red | 1.18 | 1.26 | 1.41 | 1.25 |
| Yellow | 0.6 | 0.63 | 0.6 | 0.56 | Yellow | 0.71 | 0.76 | 0.86 | 0.73 |
| Purple | — | — | — | — | Purple | — | — | — | — |
| Green | 1.07 | 1.1 | 0.93 | 1.01 | Green | 0.88 | 0.97 | 1.08 | 0.97 |
| Cyan | 1.01 | 1.06 | 0.95 | 0.94 | Cyan | 0.85 | 0.95 | 1.07 | 0.83 |
| 40° C., 90% RH | | | | | 40° C., 90% RH | | | | |
| Black | 0.99 | 1.03 | 1 | 0.97 | Black | 1.09 | 1.27 | 1.32 | 1.03 |
| Magenta | 0.93 | 0.96 | 0.99 | 0.9 | Magenta | 1.14 | 1.21 | 1.38 | 1.27 |
| Red | 1.05 | 1.05 | 1.08 | 0.97 | Red | 1.2 | 1.25 | 1.43 | 1.31 |
| Yellow | 0.61 | 0.63 | 0.64 | 0.61 | Yellow | 0.77 | 0.81 | 0.88 | 0.85 |
| Purple | — | — | 13 | — | Purple | — | — | — | — |
| Green | 1.08 | 1.12 | 0.95 | 1.03 | Green | 0.9 | 0.98 | 1.13 | 1 |
| Cyan | 1.06 | 1.09 | 1 | 0.99 | Cyan | 0.87 | 0.98 | 1.11 | 0.88 |

TABLE 7-continued

Summary of Examples 12 to 15 and
Comparative Examples C-27 to C-30

| HP 2500 CP | Example | | | | NOVAJET 630 | Example | | | |
|---|---|---|---|---|---|---|---|---|---|
| | 12 4.8 mil paper | 13 4.6 mil paper | C-27 COMM 3 | C-28 COMM 4 | | 14 4.8 mil paper | 15 4.6 mil paper | C-29 COMM 3 | C-30 COMM 4 |
| % Change | | | | | % Change | | | | |
| Black | 101.0 | 101.0 | 104.2 | 111.5 | Black | 106.9 | 102.4 | 107.3 | 118.4 |
| Magenta | 101.1 | 99.0 | 106.5 | 109.8 | Magenta | 101.8 | 96.8 | 103.0 | 115.5 |
| Red | 100.0 | 98.1 | 102.9 | 105.4 | Red | 101.7 | 99.2 | 101.4 | 104.8 |
| Yellow | 101.7 | 100.0 | 106.7 | 108.9 | Yellow | 108.5 | 106.6 | 102.3 | 116.4 |
| Purple | — | — | — | — | Purple | — | — | — | — |
| Green | 100.9 | 101.8 | 102.2 | 102.0 | Green | 102.3 | 101.1 | 104.6 | 103.1 |
| Cyan | 105.0 | 102.8 | 105.3 | 105.3 | Cyan | 102.4 | 103.2 | 103.7 | 106.0 |

As shown in Table 7, the ink jet recording materials of the present invention demonstrate good humidity resistance regardless of whether an undercoat layer is employed. More specifically, images recorded on Examples 12 and 14, which contained both an undercoat and an ink jet receptive layer, Examples 13 and 15, which contained only an ink jet receptive layer, and on Comparative Examples C-27 and C-29, demonstrated good humidity resistance, while images formed on Comparative Examples C-28 and C-30 showed poor humidity resistance or stability in at least one color.

Part B

In the working examples set forth below, the following components and base papers were used. Components used in this part of the Specific Embodiment section, which are not listed below, are described in Part A.

| | |
|---|---|
| SILICA GEL I | a silica gel having a pore volume of 1.2 cc/g and an average particle size of 5.3µ marketed by Grace Davison under the trade designation SYLOID 74 × 6500 silica gel. |
| SILICA GEL II | silica gel having a pore volume of 1.7 cc/g and an average particle size of 5.2µ marketed by Grace Davison under the trade designation SYLOID 234 silica gel. |
| PCC I | a precipitated calcium carbonate water-based dispersion supplied at 25.5% solids, marketed by Specialty Minerals Technologies Inc., 35 Highland Avenue, Bethlehem, PA 18017, under the trade designation JETCOAT 30 precipitated calcium carbonate. |
| PCC II | a precipitated calcium carbonate pigment marketed by Fitz Chem Corporation, 185 Industrial Drive, Elmhurst, IL 60126-1601, under the trade designation MAGNUM GLOSS precipitated calcium carbonate. |
| ALUMINA TRIHYDRATE | an alumina trihydrate pigment marketed by Alcan Chemicals, a division of Alcan Aluminum Corporation, 3690 Orange Place, Suite 400, Cleveland, OH 44122, under the trade designation GENBRITE 700 alumina trihydrate pigment. |
| PVA I | a super hydrolyzed, medium viscosity polyvinyl alcohol marketed by Air Products under the trade designation AIRVOL 125 polyvinyl alcohol. |
| PVA II | a partially hydrolyzed, medium viscosity polyvinyl alcohol marketed by Air Products under the trade designation AIRVOL 523 polyvinyl alcohol. |
| PVA III | a partially hydrolyzed, low viscosity polyvinyl alcohol marketed by Air Products under the trade designation AIRVOL 205 polyvinyl alcohol. |
| CATIONIC STARCH | a cationic starch marketed by National Starch and Chemical Co., 10 Finderne Ave., P.O. Box 6500, Bridgewater, N.J. 08807 under the trade designation CATO SIZE 240A cationic starch. |
| BIOCIDE | a biocide marketed by Calgon Corporation, under the trade designation TEKTAMER 38 LV 1,2-dibromo-2,4-dicyanobutane aqueous dispersion. |
| BINDER I | a blend of the following components:<br>1. 39.80% by wt. (dry) of PVA I;<br>2. 35.40% by wt. (dry) of PVA II;<br>3. 7.08% by wt. (dry) of PVA III;<br>4. 17.70% by wt. (dry) of CATIONIC STARCH; and<br>5. 0.02% by wt. (dry) of BIOCIDE.<br>BINDER I was prepared by: adding components 1 through 4, in solid form, to a mixing tank containing water; heating the resulting mixture, by steam injection, to approximately 96° C.; maintaining that temperature for 30 minutes; cooling the mixture to a temperature |

-continued

| | |
|---|---|
| | below 38° C.; adding component 5, and then adjusting the solids content to about 10% by wt. |
| BLUEING DYE II | a water-based blueing pigment dye marketed by Bayer Industrial Chemicals, 100 Bayer Road, Pittsburgh, PA 15205, under the trade designation PONOLITH RED WC water-based blueing pigment dye. |
| BP-1 | a wood free base paper having a basis weight of 120 $g/m^2$ and a Cobb sizing of less than 80 $g/m^2$, sold by Blue Ridge Paper Products Inc., 34 Park Street, Canton, NC 28716, under the trade designation 80# Ink Jet Coating Base, grade specification INK081B86. |
| BP-2 | a wood free base paper having a basis weight of 120 $g/m^2$ and a Cobb sizing of less than 80 $g/m^2$, sold by Blue Ridge Paper Products Inc., under the trade designation 81# Coating Base Hi-Brite, grade specification INK081WHI. |

Test Methods

Ink jet recording materials, prepared as set forth hereinbelow, were subjected to several evaluation tests. As in Part A of this section, NOVAJET 630 and HP-2500 CP wide format printers manufactured by Encad, Inc. and Hewlett Packard Co., respectively, were used in conjunction with these tests. The printers were used to print images on the ink jet recording materials using seven colors.

A test target, for each color tested, was made using CORELDRAW 9 software, manufactured by Corel Corporation, 1600 Carling Avenue, Ottawa, Ontario, Canada. The color properties were defined by applying a CMYK model (i.e., the test print to measure optical densities defined each color as follows: Black (K:100), Magenta (M:100), Red (M:100, Y:100), Yellow (Y:100), Purple (M:100, C:100), Green (C:100, Y:100) and Cyan (C: 100)). The test target was imported into POSTERSHOP software manufactured by Onyx Graphics Corp., 6915 South High Tech Drive, Midvale, Utah and printed as per the settings described in Part A for the NOVAJET 630 printer and the HP-2500 CP printer.

Image Density, Lightfastness and Waterfastness

Image densities were measured in accordance with the procedure outlined in Part A. Similarly, lightfastness and waterfastness were determined in accordance with the test methods previously described in this section.

Percent waterfastness was calculated by first dividing the image densities after waterfastness testing by the image densities prior to testing, multiplying each result by 100 for each color tested, and then averaging the results.

Waterfastness (V) refers to the visual appearance of the printed area of the ink jet recording material after waterfastness testing. Visual appearance was rated as follows:

| Rating | Waterfastness (V) |
|---|---|
| 1 | minimal to no ink diffusion, little or no visual changes in image densities—rated very good |
| 2 | low ink diffusion, little or no visual changes in image densities—rated good |
| 3 | moderate ink diffusion, little or no visual change in image densities—rated fair |
| 4 | clear reduction in image densities or coating structure significantly affected—rated poor |

Mottle

Mottle (P,F) refers to the visual uniformity of the printed area of the ink jet recording materials. A Pass (P) rating indicates that no visual non-uniformity was observed in the printed area, while a Fail (F) rating indicates that some visual non-uniformity was observed in the printed area that was not related to the base paper formation.

Wicking

Wicking performance, which is a measure of the degree of dot gain, was determined by inspecting non-printed areas of each sample between printed bands of a given color using an 8× magnifier. Wicking was rated as follows:

| Rating | Wicking Performance |
|---|---|
| 1 | none or minimal feathering—rated very good |
| 2 | low to medium feathering—rated good |
| 3 | medium to high feathering—rated fair/poor |
| 4 | very high degree of feathering—rated poor |

The reported wicking performance rating for each sample was the highest rating for the colors tested.

Intercolor Bleeding

For this test, a yellow background was printed on each test sample. Black and purple bands were then printed on the yellow background and the yellow areas between the black and purple bands inspected using an 8× magnifier. Intercolor bleeding was rated as follows:

| Rating | Intercolor Bleeding |
|---|---|
| 1 | none or minimal intercolor bleeding—rated very good |
| 2 | low to medium intercolor bleeding—rated good |
| 3 | medium to high intercolor bleeding—rated fair/poor |
| 4 | very high degree of intercolor bleeding—rated poor |

The reported wicking performance rating for each sample was the highest rating for the colors tested.

Humidity Resistance

Humidity resistance was determined in accordance with the test method previously described in Part A. For this test, the test print target was based on a 50% tint coverage (i.e., the color properties were defined by applying the following CMYK model—Black (K:50), Magenta (M:50), Red (M:50, Y:50), Yellow (Y:50), Green (C:50, Y:50) and Cyan (C:50)). Percent humidity resistance was calculated by first dividing the image densities after humidity resistance testing by the image densities prior to testing, multiplying each result by 100 for each color tested (hereinafter referred to as "individual color percentage change"), and then averaging the results. Δ(max %−100) is defined as the difference between the maximum individual color percentage change, under heat and humidity conditions, minus 100.

1. Effect of FWA on Performance of Inventive Ink Jet Recording Material.

In these examples, the aqueous coating formulations described below in Table 1A, were applied to BP-1 and BP-2 base papers to form either 5 or 8 g/m² undercoat layers. Then, the aqueous coating formulations described below in Table 1B, were applied to uncoated BP-1 and BP-2 base papers and to the pre-coated base papers to form either 5, 8 or 13 g/m² ink jet receptive layers.

TABLE 1A

Coating Formulations For Undercoat Layer

| Components | Undercoat Layer | | | |
|---|---|---|---|---|
| (parts by weight) | I | II | III | IV |
| WATER | 130 | 130 | 130 | 130 |
| DISPERSING AGENT | 6 | 6 | 6 | 6 |
| FWA | 1.4 | 2.5 | 3.3 | 0 |
| ALUMINA TRIHYDRATE | 78 | 78 | 78 | 78 |
| BINDER 1[1] | 137 | 137 | 137 | 137 |
| WETTING AGENT[2] | 0.3 | 0.3 | 0.3 | 0.3 |
| DILUTION WATER | 176.4 | 177.1 | 177.6 | 175.5 |
| % SOLIDS | 18 | 18 | 18 | 18 |

[1]10% aqueous solution
[2]diluted 1:10 with water prior to using

TABLE 1B

Coating Formulations For Ink Jet Receptive Layer

| Components | Ink Jet Receptive Layer | | | | | |
|---|---|---|---|---|---|---|
| (parts by weight) | I | II | III | IV | V | VI |
| WATER | 70.3 | 70.7 | 71.0 | 71.3 | 70.0 | 73.73 |
| FWA | 0.5 | 1.1 | 1.6 | 2.2 | 0 | 0.5 |
| CATIONIC RESIN | 9.2 | 9.2 | 9.2 | 9.2 | 9.2 | 9.2 |
| SILICA GEL I | 21.6 | 21.6 | 21.6 | 21.6 | 21.6 | 21.6 |
| PCC I | 78 | 78 | 78 | 78 | 78 | 78 |
| BINDER I[3] | 133.4 | 133.4 | 133.4 | 133.4 | 133.4 | 133.4 |
| CATIONIC ACRYLIC RESIN | 11 | 11 | 11 | 11 | 11 | 11 |
| BLUEING DYE I[4] | 0.9 | 0.9 | 0.9 | 0.9 | 0.9 | 0 |
| BLUEING DYE II[5] | 2.6 | 2.6 | 2.6 | 2.6 | 2.6 | 0 |
| WETTING AGENT[6] | 0.3 | 0.3 | 0.3 | 0.3 | 0.3 | 0.3 |
| DILUTION WATER | 19.3 | 19.3 | 19.3 | 19.3 | 19.3 | 19.3 |
| % SOLIDS | 18 | 18 | 18 | 18 | 18 | 18 |
| | I-21 | I-22 | I-23 | I-24 | I-25 | I-26 |

[3]10% aqueous solution
[4]supplied at 24.9% solids, diluted 1:100 with water prior to using
[5]supplied at 20.5% solids, diluted 1:100 with water prior to using
[6]diluted 1:10 with water prior to using

EXAMPLES 1B TO 24B

In these examples, the coated ink jet recording materials of the present invention were evaluated for lightfastness in accordance with the test procedure set forth in Part A of the present section. The results are shown in Table 2, hereinbelow.

TABLE 2

Summary of Examples 1B–24B and Controls C-1 to C-4

| | Substrate | Undercoat Layer[1] | Ink Jet Receptive Layer[2] | Brightness | | Whiteness | | Yellowness | | |
|---|---|---|---|---|---|---|---|---|---|---|
| | | | | Initial | After UV | Initial | After UV | Initial | After UV | ΔE |
| Control C-1 | BP-1 | — | — | 85.89 | 84.77 | 90.08 | 81.74 | −1.40 | 1.70 | 2.07 |
| 1B (I-21) | BP-1 | — | I (0.5 FWA) | 90.50 | 86.68 | 107.41 | 88.60 | −6.44 | −0.23 | 4.08 |
| 2B (I-22) | BP-1 | — | II (1.1 FWA) | 92.76 | 87.41 | 115.53 | 91.58 | −8.76 | −1.08 | 5.07 |
| 3B (I-23) | BP-1 | — | III (1.6 FWA) | 93.58 | 86.75 | 118.15 | 89.34 | −9.75 | −0.42 | 5.9 |
| 4B (I-24) | BP-1 | — | IV (2.2 FWA) | 93.76 | 86.68 | 117.64 | 88.49 | −9.61 | −0.16 | 5.93 |
| 5B (I-25) | BP-1 | — | V (0 FWA) | 86.62 | 85.70 | 91.82 | 84.30 | −1.69 | 1.14 | 1.89 |
| 6B (I-26) | BP-1 | — | VI (0.5 FWA) | 91.15 | 87.18 | 106.58 | 86.95 | −5.83 | 0.61 | 4.19 |
| Control C-2 | BP-2 | — | — | 91.80 | 89.34 | 109.18 | 100.01 | −7.07 | −4.25 | 1.82 |
| 7B (I-21) | BP-2 | — | I (0.5 FWA) | 94.19 | 90.71 | 117.00 | 103.17 | −9.23 | −5.06 | 2.78 |
| 8B (I-22) | BP-2 | — | II (1.1 FWA) | 94.65 | 90.46 | 120.44 | 104.80 | −10.39 | −5.63 | 3.06 |
| 9B (I-23) | BP-2 | — | III (1.6 FWA) | 95.62 | 89.85 | 122.63 | 101.41 | −10.91 | −4.49 | 4.15 |
| 10B (I-24) | BP-2 | — | IV (2.2 FWA) | 95.75 | 89.50 | 122.18 | 100.14 | −10.88 | −4.13 | 4.23 |

TABLE 2-continued

Summary of Examples 1B–24B and Controls C-1 to C-4

| | Substrate | Undercoat Layer[1] | Ink Jet Receptive Layer[2] | Brightness Initial | Brightness After UV | Whiteness Initial | Whiteness After UV | Yellowness Initial | Yellowness After UV | ΔE |
|---|---|---|---|---|---|---|---|---|---|---|
| 11B (I-25) | BP-2 | — | V (0 FWA) | 90.92 | 88.97 | 105.02 | 98.11 | −5.59 | −3.49 | 1.35 |
| 12B (I-26) | BP-2 | — | VI (0.5 FWA) | 93.76 | 90.24 | 113.52 | 99.39 | −7.91 | −3.54 | 2.81 |
| Control C-3 | BP-1 | UCL (I) (1.4 FWA) | — | 92.73 | 89.89 | 110.73 | 96.18 | −6.83 | −2.04 | 3.20 |
| 13B (I-21-U) | BP-1 | UCL (I) (1.4 FWA) | I (0.5 FWA) | 93.22 | 89.89 | 115.07 | 96.18 | −8.47 | −2.04 | 4.35 |
| 14B (I-22-U) | BP-1 | UCL (I) (1.4 FWA) | II (1.1 FWA) | 94.96 | 89.47 | 121.31 | 97.01 | −10.29 | −3.01 | 5.07 |
| 15B (I-23-U) | BP-1 | UCL (I) (1.4 FWA) | III (1.6 FWA) | 95.59 | 89.05 | 122.59 | 95.61 | −10.70 | −2.18 | 5.49 |
| 16B (I-24-U) | BP-1 | UCL (I) (1.4 FWA) | IV (2.2 FWA) | 95.62 | 88.83 | 121.38 | 94.67 | −10.44 | −1.89 | 5.35 |
| 17B (I-25-U) | BP-1 | UCL (I) (1.4 FWA) | V (0 FWA) | 90.52 | 88.21 | 103.90 | 91.97 | −5.04 | −1.00 | 2.62 |
| 18B (I-26-U) | BP-1 | UCL (I) (1.4 FWA) | VI (0.5 FWA) | 93.96 | 89.41 | 113.85 | 93.62 | −7.65 | −1.29 | 4.2 |
| Control C-4 | BP-2 | UCL (I) (1.4 FWA) | — | 95.53 | 92.75 | 117.82 | 107.02 | −8.84 | −5.58 | 2.15 |
| 19B (I-21-U) | BP-2 | UCL (I) (1.4 FWA) | I (0.5 FWA) | 95.92 | 91.83 | 121.10 | 104.95 | −10.07 | −5.27 | 3.22 |
| 20B (I-22-U) | BP-2 | UCL (I) (1.4 FWA) | II (1.1 FWA) | 96.66 | 91.02 | 124.62 | 103.52 | −11.17 | −4.84 | 4.11 |
| 21B (I-23-U) | BP-2 | UCL (I) (1.4 FWA) | III (1.6 FWA) | 97.07 | 91.39 | 125.77 | 104.65 | −11.58 | −5.20 | 4.14 |
| 22B (I-24-U) | BP-2 | UCL (I) (1.4 FWA) | IV (2.2 FWA) | 97.06 | 91.26 | 124.46 | 103.81 | −11.21 | −4.92 | 3.98 |
| 23B (I-25-U) | BP-2 | UCL (I) (1.4 FWA) | V (0 FWA) | 92.62 | 90.05 | 109.01 | 99.84 | −6.51 | −3.73 | 1.78 |
| 24B (I-26-U) | BP-2 | UCL (I) (1.4 FWA) | VI (0.5 FWA) | 95.55 | 92.27 | 117.38 | 104.27 | −8.65 | −4.72 | 2.63 |

[1]Basis Weight = 5 g/m$^2$
[2]Basis Weight = 8 g/m$^2$

As shown by Controls C-1 and C-3 and Controls C-2 and C-4 in Table 2, the undercoat layer of the ink jet recording material of the present invention serves to greatly increase the brightness and whiteness of the base paper. BP-2 base papers are preferred base papers due to the lower ΔE values after UV exposure.

Control C-1 and Example 5B, as well as, Control C-2 and Example 11B, demonstrate that the ink receptive layer, when it does not employ a whitening agent, serves to improve the lightfastness of the base paper. A similar conclusion may be drawn from Control C-3 and Examples 17B and Control C-4 and Example 23B.

Examples 1B to 4B, 7B to 10B, 13B to 16B and 19B to 22B demonstrate that lightfastness diminishes as the level of FWA increases in the ink jet receptive layer. More specifically, although FWAs enhance brightness and whiteness, they appear to degrade upon UV light exposure resulting in a yellowish tint background and thus a decrease in background light stability or lightfastness.

The results shown in Table 2 appear to suggest that achievable brightness and whiteness is limited to the brightness and whiteness of the base paper.

EXAMPLES 25B TO 44B

In these examples, undercoat layers having varying amounts of FWAs were applied to BP-2 base papers. Ink jet receptive layers having varying amount of FWAs were then applied to some of the coated base papers. The prepared samples were tested for lightfastness in accordance with the test procedure set forth in Part A of the present section. The results are set forth in Table 3, hereinbelow.

TABLE 3

Summary of Examples 25B–44B

| Example | Substrate | Undercoat Layer[1] | Ink Jet Receptive Layer[2] | Brightness Initial | Brightness After UV | Whiteness Initial | Whiteness After UV | Yellowness Initial | Yellowness After UV | ΔE |
|---|---|---|---|---|---|---|---|---|---|---|
| 25B (I-34) | BP-2 | UCL(IV) (0 FWA) | — | 92.22 | 90.56 | 104.30 | 97.99 | −4.83 | −2.88 | 1.25 |
| 26B (I-20) | BP-2 | UCL(I) (1.4 FWA) | — | 95.53 | 92.75 | 117.82 | 107.02 | −8.84 | −5.58 | 2.15 |

TABLE 3-continued

Summary of Examples 25B–44B

| Example | Substrate | Undercoat Layer[1] | Ink Jet Receptive Layer[2] | Brightness Initial | Brightness After UV | Whiteness Initial | Whiteness After UV | Yellowness Initial | Yellowness After UV | ΔE |
|---|---|---|---|---|---|---|---|---|---|---|
| 27B (I-32) | BP-2 | UCL(II) (2.5 FWA) | — | 96.77 | 93.14 | 121.74 | 107.50 | −9.92 | −5.69 | 2.85 |
| 28B (I-33) | BP-2 | UCL(III) (3.3 FWA) | — | 97.38 | 93.00 | 123.91 | 106.80 | −10.59 | −5.51 | 3.39 |
| 29B (I-34/I-21) | BP-2 | UCL(IV) (0 FWA) | I (0.5 FWA) | 94.46 | 90.74 | 116.23 | 101.48 | −8.53 | −4.15 | 2.95 |
| 30B (I-34/I-22) | BP-2 | UCL(IV) (0 FWA) | II (1.1 FWA) | 96.21 | 90.84 | 122.93 | 102.19 | −10.57 | −4.30 | 4.09 |
| 31B (I-34/I-23) | BP-2 | UCL(IV) (0 FWA) | III (1.6 FWA) | 96.68 | 90.88 | 125.00 | 102.09 | −11.15 | −4.33 | 4.50 |
| 32B (I-34/I-24) | BP-2 | UCL(IV) (0 FWA) | IV (2.1 FWA) | 96.86 | 90.62 | 123.99 | 101.01 | −10.95 | −3.99 | 4.45 |
| 33B (I-20/I-21) | BP-2 | UCL(I) (1.4 FWA) | I (0.5 FWA) | 95.92 | 91.83 | 121.10 | 104.95 | −10.07 | −5.27 | 3.22 |
| 34B (I-20/I-22) | BP-2 | UCL(1) (1.4 FWA) | II (1.1 FWA) | 96.66 | 91.02 | 124.62 | 103.52 | −11.17 | −4.84 | 4.11 |
| 35B (I-20/I-23) | BP-2 | UCL(1) (1.4 FWA) | III (1.6 FWA) | 97.07 | 91.39 | 125.77 | 104.65 | −11.58 | −5.2 | 4.14 |
| 36B (I-20/I-24) | BP-2 | UCL(I) (1.4 FWA) | IV (2.1 FWA) | 97.06 | 91.26 | 124.46 | 103.81 | −11.21 | −4.92 | 3.98 |
| 37B (I-32/I-21) | BP-2 | UCL(II) (2.5 FWA) | I (0.5 FWA) | 95.68 | 91.14 | 120.11 | 102.87 | −9.65 | −4.59 | 3.42 |
| 38B (I-32/I-22) | BP-2 | UCL(II) (2.5 FWA) | II (1.1 FWA) | 96.95 | 90.81 | 124.44 | 102.25 | −10.99 | −4.42 | 4.31 |
| 39B (I-32/I-23) | BP-2 | UCL(II) (2.5 FWA) | III (1.6 FWA) | 97.27 | 90.92 | 125.35 | 102.04 | −11.33 | −4.33 | 4.51 |
| 40B (I-32/I-24) | BP-2 | UCL(II) (2.5 FWA) | IV (2.1 FWA) | 97.37 | 90.57 | 124.82 | 100.41 | −11.16 | −3.84 | 4.70 |
| 41B (I-33/I-21) | BP-2 | UCL(III) (3.3 FWA) | I (0.5 FWA) | 95.85 | 91.28 | 120.44 | 103.0 | −9.81 | −4.57 | 3.44 |
| 42B (I-33/I-22) | BP-2 | UCL(III) (3.3 FWA) | II (1.1 FWA) | 97.00 | 91.17 | 124.33 | 102.93 | −11.01 | −4.57 | 4.15 |
| 43B (I-33/I-23) | BP-2 | UCL(III) (3.3 FWA) | III (1.6 EWA) | 97.44 | 90.94 | 125.12 | 101.94 | −11.21 | −4.30 | 4.46 |
| 44B (I-33/I-24) | BP-2 | UCL(III) (3.3 FWA) | IV (2.1 FWA) | 97.37 | 90.62 | 124.23 | 100.47 | −11.07 | −3.86 | 4.53 |

[1]Basis Weight = 5 g/m$^2$
[2]Basis Weight = 8 g/m$^2$

Examples 7B to 10B, as shown in Table 2, and Examples 25B to 28B, as shown in Table 3, demonstrate that increasing the amount of FWA in the undercoat layer does not impact upon lightfastness to the same extent as increasing the amount of FWA in the ink jet receptive layer. This result is unexpected. For those working examples employing the same ink jet receptive layer, the dose of UV radiation reaching the undercoat layer should be equivalent to the dose of UV radiation reaching the ink jet receptive layer. Thus, one would expect the same impact on lightfastness regardless of whether the FWA is present in the undercoat layer or in the ink jet receptive layer.

Examples 29B, 33B, 37B and 41B, Examples 30B, 34B, 38B and 42B, Examples 31B, 35B, 39B and 43B and Examples 32B, 36B, 40B and 44B further demonstrate that the degree of lightfastness is directly related to the amount of FWA in the ink jet receptive layer and not the FWA level in the undercoat layer.

EXAMPLES 45B TO 49B

In these examples, BP-2 base papers were coated with undercoat layers and ink jet layers having different basis weights. The prepared samples were tested for lightfastness and the results detailed in Table 4, hereinbelow.

TABLE 4

Summary of Examples 45B–49B

| Example | Substrate | Undercoat Layer | Basis Wt. (g/m$^2$) | Ink Jet Receptive Layer | Basis Wt. (g/m2) | Brightness Initial | Whiteness Initial | ΔE |
|---|---|---|---|---|---|---|---|---|
| 45B (I-20/I-21) | BP-2 | UCL (I) (1.4 FWA) | 5 | IJRL(I) (0.5 FWA) | 5 | 95.59 | 120.56 | 3.44 |
| 46B | BP-2 | UCL (I) | 5 | IJRL(I) | 8 | 95.92 | 121.10 | 3.22 |

TABLE 4-continued

Summary of Examples 45B–49B

| Example | Substrate | Undercoat Layer | Basis Wt. (g/m²) | Ink Jet Receptive Layer | Basis Wt. (g/m2) | Brightness Initial | Whiteness Initial | ΔE |
|---|---|---|---|---|---|---|---|---|
| 47B (I-20/I-21) | BP-2 | UCL (I) (1.4 FWA) | 5 | IJRL(I) (0.5 FWA) | 13 | 95.48 | 120.39 | 3.47 |
| 48B (I-20/I-21) | BP-2 | UCL (I) (1.4 FWA) | 8 | IJRL(I) (0.5 FWA) | 5 | 96.44 | 121.83 | 3.29 |
| 49B (I-20/I-21) | BP-2 | UCL (I) (1.4 FWA) | 8 | IJRL(I) (0.5 FWA) | 13 | 96.30 | 122.05 | 3.41 |

As shown in Table 4, lightfastness is not impacted to any great extent by the basis weight of the undercoat layer and/or the ink jet receptive layer.

In the light of the above, it is preferred to increase the amount of FWA in the undercoat layer to maximize initial brightness and whiteness while decreasing the amount of FWA in the ink jet receptive layer to achieve desired optical properties and lightfastness.

2. Effect of Pigment Composition on Performance of Inventive Ink Jet Recording Material.

In these examples, the aqueous coating formulations used for forming undercoat layer UCL (I), as described in Table 1A, were applied to BP-2 base papers to form 5 g/m² undercoat layers. Then, the aqueous coating formulations described below in Table 5A, were applied to uncoated BP-2 base papers and to the pre-coated base papers to form 8 g/m² ink jet receptive layers.

TABLE 5A

Coating Formulations For Ink Jet Receptive Layer

| Components (parts by weight) | VII | VIII | IX | X | XI | XII | XIII | XIV | XV | XVI |
|---|---|---|---|---|---|---|---|---|---|---|
| FWA | 0.5 | 0.5 | 0.5 | 0.5 | 0.5 | 0.5 | 0.5 | 0.5 | 0.5 | 0.5 |
| CATIONIC RESIN | 9.2 | 9.2 | 9.2 | 9.2 | 9.2 | 9.2 | 9.2 | 9.2 | 9.2 | 9.2 |
| SILICA GEL I | 21.6 | 41.5 | 31.1 | 0 | 0 | 21.6 | 21.6 | 20.6 | 25 | 16.5 |
| SILICA GEL II | 0 | 0 | 10.4 | 41.5 | 0 | 0 | 0 | 0 | 0 | 0 |
| PCC I | 78 | 0 | 0 | 0 | 162.8 | 0 | 0 | 74 | 64.7 | 98 |
| PCC II (Magnum Gloss) | 0 | 0 | 0 | 0 | 0 | 19.9 | 0 | 0 | 0 | 0 |
| ALUMINA TRIHYDRATE | 0 | 0 | 0 | 0 | 0 | 0 | 19.9 | 2 | 0 | 0 |
| BINDER I[1] | 133.5 | 133.5 | 133.5 | 133.5 | 133.5 | 133.5 | 133.5 | 133.5 | 133.5 | 133.5 |
| CATIONIC ACRYLIC RESIN | 11 | 11 | 11 | 11 | 11 | 11 | 11 | 11 | 11 | 11 |
| BLUEING DYE I[2] | 0.9 | 0.9 | 0.9 | 0.9 | 0.9 | 0.9 | 0.9 | 0.9 | 0.9 | 0.9 |
| BLUEING DYE II[3] | 2.6 | 2.6 | 2.6 | 2.6 | 2.6 | 2.60 | 2.6 | 2.6 | 2.6 | 2.6 |
| WETTING AGENT[4] | 0.3 | 0.3 | 0.3 | 0.3 | 0.3 | 0.3 | 0.3 | 0.3 | 0.3 | 0.3 |
| WATER | 90 | 147.8 | 147.8 | 147.8 | 26.5 | 147.8 | 147.8 | 92.6 | 99.6 | 74.7 |
| % SOLIDS | 18 | 18 | 18 | 18 | 18 | 18 | 18 | 18 | 18 | 18 |
| | I-1 | I-2 | I-3 | I-4 | I-5 | I-6 | I-7 | I-8 | I-9 | I-10 |

[1]10% aqueous solution.
[2]Supplied at 24.9% solids, diluted 1:100 with water prior to using.
[3]Supplied at 20.5% solids, diluted 1:100 with water prior to using.
[4]Dilute 1:10 with water prior to using.

TABLE 5B

Pigment Compositions in Ink Jet Receptive Layer[1]

| Pigment Composition (dry parts pigment per 100 parts total pigment) | Ink Jet Receptive Layer | | | | | | | | | |
|---|---|---|---|---|---|---|---|---|---|---|
| | VII | VIII | IX | X | XI | XII | XIII | XIV | XV | XVI |
| SILICA GEL I | 52.1 | 100.0 | 75.0 | — | — | 52.1 | 52.1 | 49.7 | 60.3 | 39.7 |
| SILICA GEL II | — | — | 25.0 | 100.0 | — | — | — | — | — | — |
| PCC I | 47.9 | — | — | — | 100.0 | — | — | 45.5 | 39.7 | 60.3 |
| PCC II | — | — | — | — | — | 47.9 | — | — | — | — |
| ALUMNA TRIHYDRATE | — | — | — | — | — | — | 47.9 | 4.8 | — | — |
| | I-1 | I-2 | I-3 | I-4 | I-5 | I-6 | I-7 | I-8 | I-9 | I-10 |

[1]Binder-To-Pigment Ratio (dry parts binder per 100 parts of dry pigment) = 43

EXAMPLES 50B TO 69B

In these examples, the ink jet recording materials of the present invention were evaluated for lightfastness in accordance with the test procedure set forth in Part A of the present section. The results are shown in Table 6, hereinbelow.

TABLE 6

Summary of Examples 50B–69B

| Example | Undercoat Layer | Ink Jet Receptive Layer | Brightness Initial | Brightness After UV | Whiteness Initial | Whiteness After UV | Yellowness Initial | Yellowness After UV | ΔE |
|---|---|---|---|---|---|---|---|---|---|
| 50B | — | VII (Silica Gel I/PCC I) | 94.19 | 90.71 | 117.0 | 103.17 | −9.23 | −5.06 | 2.78 |
| 51B | — | VIII (Silica Gel I) | 93.87 | 90.14 | 115.25 | 100.66 | −8.66 | −4.23 | 2.91 |
| 52B | — | IX (Silica Gel I/Silica Gel II) | 93.58 | 90.30 | 114.55 | 101.24 | −8.53 | −4.46 | 2.72 |
| 53B | — | X (Silica Gel II) | 93.79 | 89.93 | 116.39 | 100.96 | −8.89 | −4.46 | 3.12 |
| 54B | — | XI (PCC I) | 94.30 | 90.84 | 119.51 | 106.90 | −10.37 | −6.68 | 2.27 |
| 55B | — | XII (Silica Gel I/PCC II) | 93.58 | 90.36 | 115.93 | 102.77 | −9.06 | −5.09 | 2.78 |
| 56B | — | XIII (Silica Gel I/Alumina) | 94.56 | 90.79 | 117.56 | 102.70 | −9.41 | −4.99 | 2.99 |
| 57B | — | XIV (Silica Gel I/PCC I/Alumina) | 94.23 | 90.45 | 117.42 | 102.72 | −9.31 | −4.89 | 2.94 |
| 58B | — | XV (Silica Gel I/PCC I) | 94.25 | 90.70 | 117.26 | 103.19 | −9.34 | −4.98 | 2.83 |
| 59B | — | XVI (Silica Gel I/PCC I) | 94.40 | 90.24 | 118.45 | 102.95 | −9.72 | −5.15 | 3.06 |
| 60B | UCL (I) | VII (Silica Gel I/PCC I) | 95.92 | 91.83 | 121.10 | 104.95 | −10.27 | −5.27 | 3.22 |
| 61B | UCL (I) | VIII (Silica Gel I) | 95.33 | 91.58 | 118.09 | 102.65 | −9.16 | −4.63 | 3.13 |
| 62B | UCL (I) | IX (Silica Gel I/Silica Gel II) | 95.39 | 91.30 | 118.30 | 102.26 | −9.22 | −4.42 | 3.17 |
| 63B | UCL (I) | X (Silica Gel II) | 95.09 | 91.14 | 118.49 | 103.14 | −9.31 | −4.81 | 3.05 |
| 64B | UCL (I) | XI (PCC I) | 96.67 | 92.71 | 124.38 | 109.25 | −11.20 | −6.67 | 3 |
| 65B | UCL (I) | XII (Silica Gel I/PCC II) | 95.38 | 91.30 | 119.13 | 104.03 | −9.67 | −5.09 | 2.96 |
| 66B | UCL (I) | XIII (Silica Gel I/Alumina) | 95.48 | 91.56 | 117.87 | 103.14 | −9.25 | −4.73 | 2.86 |
| 67B | UCL (I) | XIV (Silica Gel I/PCC I/Alumina) | 95.87 | 91.77 | 120.69 | 105.80 | −9.91 | −5.48 | 2.96 |
| 68B | UCL (I) | XV (Silica Gel I/PCC I) | 95.86 | 92.84 | 121.09 | 104.27 | −10.12 | −5.11 | 3.33 |
| 69B | UCL (I) | XVI (Silica Gel I/PCC I) | 96.05 | 92.73 | 121.37 | 105.75 | −10.20 | −5.51 | 3.11 |

Examples 50B to 69B, as shown in Table 6, demonstrate that the brightness, whiteness and light stability demonstrated by the ink jet recording materials of the present invention are not affected by the pigment compositions used in the ink jet receptive layer. These Examples further demonstrate that higher brightness and whiteness values are achieved when the ink jet recording material employs an undercoat layer.

EXAMPLES 70B TO 89B

In these examples, the ink jet recording materials of the present invention were imaged using either an HP-2500 CP or NOVAJET 630 wide format printer and the image densities of the formed images measured and recorded. The results are set forth in Table 7, hereinbelow.

TABLE 7

Summary of Examples 70B to 89B

| | Example | | | | | | | | | |
|---|---|---|---|---|---|---|---|---|---|---|
| | 70B | 71B | 72B | 73B | 74B | 75B | 76B | 77B | 78B | 79B |
| Undercoat Layer | — | — | — | — | — | — | — | — | — | — |
| Ink Jet Receptive Layer | VII | VIII | IX | X | XI | XII | XIII | XIV | XV | XVI |
| Pigment Compositions | Silica Gel I/ PCC I | Silica Gel I | Silica Gel I/ Silica Gel II | 100.0 Silica Gel II | PCC I | Silica Gel I/ PCC II | Silica Gel I/ Alumina | Silica Gel I/ PCC I/ Alumina | Silica Gel I/ PCC I | Silica Gel I/ PCC I |
| | | | | | Image Densities | | | | | |
| HP-2500 CP | | | | | | | | | | |
| Black | 1.66 | 1.65 | 1.66 | 1.73 | 1.63 | 1.68 | 1.46 | 1.66 | 1.68 | 1.70 |
| Magenta | 1.54 | 1.56 | 1.57 | 1.63 | 1.51 | 1.58 | 1.37 | 1.53 | 1.57 | 1.54 |
| Red | 1.46 | 1.46 | 1.47 | 1.55 | 1.49 | 1.51 | 1.30 | 1.48 | 1.48 | 1.50 |
| Yellow | 1.11 | 1.09 | 1.09 | 1.11 | 1.13 | 1.15 | 1.04 | 1.11 | 1.13 | 1.13 |
| Purple | 1.53 | 1.53 | 1.51 | 1.62 | 1.49 | 1.63 | 1.47 | 1.59 | 1.56 | 1.62 |
| Green | 1.49 | 1.48 | 1.50 | 1.55 | 1.25 | 1.60 | 1.46 | 1.55 | 1.51 | 1.57 |
| Cyan | 1.59 | 1.53 | 1.53 | 1.53 | 1.32 | 1.58 | 1.51 | 1.60 | 1.60 | 1.60 |
| SUM | 10.38 | 10.03 | 10.33 | 10.72 | 9.82 | 10.73 | 9.61 | 10.52 | 10.53 | 10.66 |
| NOVAJET 630 | | | | | | | | | | |
| Black | 1.74 | 1.66 | 1.60 | 1.61 | 1.62 | 1.75 | 1.54 | 1.74 | 1.73 | 1.76 |
| Magenta | 1.57 | 1.42 | 1.39 | 1.30 | 1.50 | 1.60 | 1.41 | 1.55 | 1.53 | 1.55 |
| Red | 1.54 | 1.44 | 1.41 | 1.45 | 1.52 | 1.58 | 1.34 | 1.52 | 1.50 | 1.53 |
| Yellow | 0.95 | 0.85 | 0.83 | 0.83 | 1.01 | 0.99 | 0.88 | 0.92 | 0.90 | 0.92 |
| Purple | 1.59 | 1.59 | 1.58 | 1.64 | 1.52 | 1.61 | 1.40 | 1.57 | 1.56 | 1.58 |
| Green | 1.56 | 1.33 | 1.28 | 1.24 | 1.24 | 1.61 | 1.45 | 1.52 | 1.46 | 1.53 |
| Cyan | 1.54 | 1.34 | 1.26 | 1.24 | 1.15 | 1.55 | 1.47 | 1.52 | 1.45 | 1.50 |
| SUM | 10.49 | 9.63 | 9.35 | 9.31 | 9.56 | 10.69 | 9.49 | 10.34 | 10.13 | 10.37 |
| | I-1 | I-2 | I-3 | I-4 | I-5 | I-6 | I-7 | I-8 | I-9 | I-10 |

| | Example | | | | | | | | | |
|---|---|---|---|---|---|---|---|---|---|---|
| | 80B | 81B | 82B | 83B | 84B | 85B | 86B | 87B | 88B | 89B |
| Undercoat Layer | UCL (I) | UCL (I) | UCL (I) | UCL (I) | UCL (I) | UCL (I) | UCL (I) | UCL (I) | UCL (I) | UCL (I) |
| Ink Jet Receptive Layer | VII | VIII | IX | X | XI | XII | XIII | XIV | XV | XVI |
| Pigment Compositions | Silica Gel I/ PCC I | Silica Gel I | Silica Gel I/ Silica Gel II | 100.0 Silica Gel II | PCC I | Silica Gel I/ PCC II | Silica Gel I/ Alumina | Silica Gel I/ PCC I/ Alumina | Silica Gel I/ PCC I | Silica Gel I/ PCC I |
| | | | | | Image Densities | | | | | |
| HP-2500 CP | | | | | | | | | | |
| Black | 1.55 | 1.42 | 1.42 | 1.42 | 1.51 | 1.63 | 1.46 | 1.58 | 1.52 | 1.61 |
| Magenta | 1.51 | 1.43 | 1.41 | 1.39 | 1.45 | 1.55 | 1.38 | 1.51 | 1.49 | 1.54 |
| Red | 1.49 | 1.45 | 1.44 | 1.40 | 1.42 | 1.50 | 1.35 | 1.48 | 1.48 | 1.48 |
| Yellow | 0.86 | 0.82 | 0.81 | 0.80 | 0.93 | 0.92 | 0.87 | 0.88 | 0.86 | 0.90 |
| Purple | 1.64 | 1.63 | 1.61 | 1.53 | 1.45 | 1.61 | 1.56 | 1.63 | 1.64 | 1.61 |
| Green | 1.61 | 1.56 | 1.58 | 1.44 | 1.37 | 1.59 | 1.54 | 1.61 | 1.64 | 1.59 |
| Cyan | 1.57 | 1.47 | 1.45 | 1.42 | 1.38 | 1.60 | 1.52 | 1.60 | 1.56 | 1.60 |
| SUM | 10.23 | 9.78 | 9.72 | 9.4 | 9.51 | 10.4 | 9.68 | 10.29 | 10.19 | 10.33 |
| NOVAJET 630 | | | | | | | | | | |
| Black | 1.76 | 1.61 | 1.55 | 1.52 | 1.57 | 1.78 | 1.59 | 1.78 | 1.76 | 1.78 |
| Magenta | 1.53 | 1.41 | 1.35 | 1.25 | 1.52 | 1.63 | 1.44 | 1.56 | 1.55 | 1.60 |
| Red | 1.55 | 1.42 | 1.40 | 1.33 | 1.51 | 1.62 | 1.39 | 1.54 | 1.53 | 1.57 |
| Yellow | 0.92 | 0.80 | 0.79 | 0.75 | 1.01 | 1.01 | 0.89 | 0.93 | 0.93 | 0.97 |
| Purple | 1.60 | 1.58 | 1.53 | 1.54 | 1.58 | 1.66 | 1.47 | 1.62 | 1.62 | 1.63 |
| Green | 1.51 | 1.33 | 1.21 | 1.22 | 1.37 | 1.61 | 1.47 | 1.56 | 1.57 | 1.59 |
| Cyan | 1.42 | 1.28 | 1.25 | 1.19 | 1.28 | 1.57 | 1.49 | 1.56 | 1.51 | 1.57 |
| SUM | 10.29 | 9.43 | 9.08 | 8.8 | 9.84 | 10.88 | 9.74 | 10.55 | 10.47 | 10.71 |
| | I-1-U | I-2-U | I-3-U | I-4-U | I-5-U | I-6-U | I-7-U | I-8-U | I-9-U | I-10-U |

Examples 70B to 89B, as shown in Table 7, demonstrate that images recorded on the ink jet recording materials of the present invention, regardless of whether an undercoat layer was employed, will have high image densities.

It is important to note that the image densities obtained for Examples 70B, 78B and 79B are greater than the image density weight average of Examples 71B (SILICA GEL I only) and Example 74B (PCC I only). Such a synergistic effect suggests an interaction between the pigment components in the ink jet receptive layer of the present invention.

EXAMPLES 90B TO 109B

In these examples, the ink jet recording materials of the present invention were imaged using either an HP-2500 CP or NOVAJET 630 wide format printer and the imaged materials evaluated for lightfastness, waterfastness, mottle, wicking, intercolor bleeding and humidity resistance. The results are set forth in Table 8, hereinbelow.

TABLE 8

Summary of Examples 90B–109B

| | Example | | | | | | | | | |
|---|---|---|---|---|---|---|---|---|---|---|
| | 90B | 91B | 92B | 93B | 94B | 95B | 96B | 97B | 98B | 99B |
| Undercoat Layer | — | — | — | — | — | — | — | — | — | — |
| Ink Jet Receptive Layer | VII | VIII | IX | X | XI | XII | XIII | XIV | XV | XVI |
| Pigment Composition | Silica Gel I/ PCC I | Silica Gel I | Silica Gel I/II | Silica Gel II | PCC I | Silica Gel I/ PCC II | Silica Gel I/ Alumina | Silica Gel I/PCC I/ Alumina | Silica Gel I/ PCC I | Silica Gel I/ PCC I |
| HP-2500 CP | | | | | | | | | | |
| Lightfastness (%) | 94 | 95 | 96 | 95 | 93 | 94 | 94 | 94 | 93 | 95 |
| Waterfastness (%) | 101 | 100 | 100 | 100 | 105 | 100 | 100 | 101 | 101 | 102 |
| Waterfastness (V) | 1 | 2 | 2 | 2 | 2 | 3 | 2 | 2 | 2 | 2 |
| Mottle (P, F) | P | P | P | P | F | F | F | F | P | F |
| Wicking | 1 | 1 | 1 | 1 | 1 | 2 | 1 | 1 | 1 | 1 |
| Intercolor Bleeding | 3 | 2 | 1 | 1 | 3 | 5 | 4 | 4 | 3 | 5 |
| Humidity Resistance (%) | 102 | 108 | 107 | 108 | 112 | 98 | 100 | 99 | 104 | 101 |
| Δ (max %-100) | 8 | 20 | 19 | 19 | 20 | 1 | 4 | 2 | 12 | 2 |
| NOVAJET 630 | | | | | | | | | | |
| Lightfastness (%) | 85 | 87 | 86 | 87 | 77 | 84 | 82 | 82 | 84 | 83 |
| Waterfastness (%) | 102 | 104 | 107 | 109 | 99 | 99 | 99 | 100 | 103 | 101 |
| Waterfastness (V) | 3 | 3 | 2 | 3 | 1 | 1 | 1 | 1 | 1 | 1 |
| Mottle (P, F) | P | P | P | P | P | P | P | P | P | P |
| Wicking | 1 | 1 | 1 | 1 | 2 | 2 | 1 | 1 | 1 | 1 |
| Intercolor Bleeding | 1 | 1 | 1 | 1 | 2 | 5 | 2 | 1 | 1 | 2 |
| Humidity Resistance (%) | 119 | 136 | 131 | 137 | 114 | 112 | 109 | 117 | 121 | 115 |
| Δ (max %-100) | 55 | 83 | 79 | 88 | 21 | 31 | 44 | 45 | 53 | 38 |
| | I-1 | I-2 | I-3 | I-4 | I-5 | I-6 | I-7 | I-8 | I-9 | I-10 |

| | Example | | | | | | | | | |
|---|---|---|---|---|---|---|---|---|---|---|
| | 100B | 101B | 102B | 103B | 104B | 105B | 106B | 107B | 108B | 109B |
| Undercoat Layer | UCL (I) | UCL (I) | UCL (I) | UCL (I) | UCL (I) | UCL (I) | UCL (I) | UCL (I) | UCL (I) | UCL (I) |
| Ink Jet Receptive Layer | VII | VIII | IX | X | XI | XII | XIII | XIV | XV | XVI |
| Pigment Composition | Silica Gel I/ PCC I | Silica Gel I | Silica Gel I/II | Silica Gel II | PCC I | Silica Gel I/ PCC II | Silica Gel I/ Alumina | Silica Gel I/PCC I/ Alumina | Silica Gel I/ PCC I | Silica Gel I/ PCC I |
| HP-2500 CP | | | | | | | | | | |
| Lightfastness (%) | 96 | 96 | 97 | 97 | 92 | 94 | 94 | 95 | 96 | 95 |
| Waterfastness (%) | 101 | 103 | 102 | 106 | 104 | 99 | 96 | 101 | 103 | 100 |
| Waterfastness (V) | 1 | 1 | 1 | 1 | 1 | 1 | 1 | 1 | 1 | 1 |
| Mottle (P, F) | P | P | P | P | P | P | P | P | P | P |
| Wicking | 1 | 1 | 1 | 1 | 1 | 1 | 1 | 1 | 1 | 1 |
| Intercolor Bleeding | 2 | 3 | 1 | 1 | 2 | 4 | 2 | 2 | 3 | 3 |
| Humidity Resistance (%) | 105 | 107 | 105 | 108 | 113 | 105 | 103 | 103 | 105 | 106 |
| Δ (max %-100) | 9 | 14 | 10 | 15 | 23 | 9 | 6 | 9 | 11 | 14 |
| NOVAJET 630 | | | | | | | | | | |
| Lightfastness (%) | 86 | 83 | 87 | 89 | 76 | 83 | 82 | 84 | 85 | 82 |
| Waterfastness (%) | 100 | 104 | 107 | 111 | 102 | 97 | 97 | 98 | 100 | 99 |
| Waterfastness (V) | 3 | 3 | 3 | 2 | 3 | 3 | 3 | 2 | 2 | 2 |

TABLE 8-continued

Summary of Examples 90B–109B

| Mottle (P, F) | P | P | P | P | P | P | P | P | P | P |
|---|---|---|---|---|---|---|---|---|---|---|
| Wicking | 1 | 1 | 1 | 1 | 2 | 2 | 1 | 1 | 1 | 1 |
| Intercolor Bleeding | 1 | 1 | 1 | 1 | 1 | 4 | 2 | 1 | 1 | 2 |
| Humidity Resistance (%) | 117 | 136 | 140 | 132 | 120 | 111 | 111 | 115 | 120 | 110 |
| Δ (max %-100) | 53 | 85 | 100 | 84 | 31 | 37 | 50 | 50 | 66 | 36 |
| | I-1-U | 1-2-U | 1-3-U | 1-4-U | I-5-U | 1-6-U | 1-7-U | 1-8-U | 1-9-U | 1-10-U |

Examples 90B to 99B, when imaged using an NOVAJET 630 printer, and Examples 100B to 109B, when imaged using either an NOVAJET 630 or HP-2500 CP printer, consistently demonstrated good mottle or print uniformity.

The Examples further demonstrated improved humidity resistance when the ink jet receptive layer was formulated using calcium carbonate or alumina trihydrate pigments.

It is noted that the humidity resistance values obtained for Examples 90B, 98B and 99B and for Examples 100B, 108B and 109B are greater than the humidity resistance weight averages of Examples 91B and 94B and Examples 101B and 104B, respectively, once again evidencing synergism.

It is further noted that after the waterfastness test, a very slight amount of ink was visible when viewing the back of Examples 100B to 109B, while a larger amount of ink was visible when viewing the back of Examples 90B to 99B. It thus appears that the undercoat layer aids in preventing the ink from penetrating through the paper when the imaged recording material is in contact with water.

3. Effect of Binder Composition on Performance of Inventive Ink Jet Recording Material.

In these examples, the aqueous coating formulations described below in Table 9A, were applied to BP-2 base papers and to BP-2 base papers which had been pre-coated with a 5 g/m² undercoat layer (UCL (1)), to form 8 g/m² ink jet receptive layers. The pigment compositions were kept constant in the aqueous coating formulations, while the binder compositions, which are described below in Table 9B, were varied.

TABLE 9A

Coating Formulations For Ink Jet Reception Layer

| Components (parts by weight) | Ink Jet Receptive Layer | | | | | | | | |
|---|---|---|---|---|---|---|---|---|---|
| | XVII[8] | XVIII | XIX | XX | XXI | XXII | XXIII | XXIV | XXV |
| PIGMENT DISPERSION[1] | 59.8 | 59.8 | 59.8 | 59.8 | 59.8 | 59.8 | 59.8 | 59.8 | 59.8 |
| BINDER I[2] | 44.5 | 44.5 | 8.8 | — | — | — | — | 15.8 | 65 |
| BINDER II[2] | — | — | — | 44.5 | — | — | — | — | — |
| BINDER III[2] | — | — | — | — | 44.5 | — | — | — | — |
| BINDER IV[2] | — | — | — | — | — | 44.5 | — | — | — |
| BINDER V[2] | — | — | — | — | — | — | 44.5 | — | — |
| CATIONIC ACRYLIC RESIN | 3.7 | — | 3.7 | 3.7 | 3.7 | 3.7 | 3.7 | 1.3 | 6.3 |
| BLUEING DYE I[3] | 0.3 | 0.3 | 0.3 | 0.3 | 0.3 | 0.3 | 0.3 | 0.3 | 0.3 |
| BLUEING DYE II[4] | 0.9 | 0.9 | 0.9 | 0.9 | 0.9 | 0.9 | 0.9 | 0.9 | 0.9 |
| WETTING AGENT[5] | 0.1 | 0.1 | 0.1 | 0.1 | 0.1 | 0.1 | 0.1 | 0.1 | 0.1 |
| DILUTION WATER | 6.4 | 2.0 | 22.3 | 6.4 | 6.4 | 6.4 | 6.4 | 16.2 | 0.5 |
| % SOLIDS | 18 | 18 | 18 | 18 | 18 | 18 | 18 | 18 | 18 |
| BINDER-TO-PIGMENT RATIO[6] | 43 | 32 | 17 | 43 | 43 | 43 | 43 | 15 | 65 |
| BINDER-TO-PIGMENT RATIO[7] | 1:2.3 | 1:3.1 | 1:5.9 | 1:2.3 | 1:2.3 | 1:2.3 | 1:2.3 | 1:6.7 | 1:1.5 |
| | I-1 | I-12 | I-13 | I-14 | I-15 | I-16 | I-17 | I-18 | I-19 |

[1]PIGMENT DISPERSION = 1.6 parts FWA, 30.6 parts CATIONIC RESIN, 72 parts SILICA GEL I, 260 parts PCC I, 234 parts water.
[2]10% aqueous solution.
[3]Supplied at 24.9% solids, diluted 1:100 with water prior to using.
[4]Supplied at 20.5% solids, diluted 1:100 with water prior to using.
[5]Diluted 1:10 with water prior to using.
[6]Binder-To-Pigment Ratio = dry parts binder per 100 parts of dry pigment.
[7]Binder-To-Pigment Ratio = dry part binder/dry parts pigment.
[8]Dilution water added to PIGMENT DISPERSION. Batch size was three times the amount listed in Table 9A.

TABLE 9B

Binder Compositions
COMPONENTS
(% by dry weight)

| BINDER | PVA I | PVA II | PVA III | CATIONIC STARCH | BIOCIDE |
|---|---|---|---|---|---|
| BINDER I | 39.80 | 35.40 | 7.08 | 17.70 | 0.02 |
| BINDER II | 48.37 | 43.02 | 8.61 | 0 | 0 |
| BINDER III | 100.0 | 0 | 0 | 0 | 0 |
| BINDER IV | 0 | 100.0 | 0 | 0 | 0 |
| BINDER V | 0 | 0 | 100.0 | 0 | 0 |

EXAMPLES 110B TO 120B

In these examples, the ink jet recording materials of the present invention were evaluated for lightfastness in accordance with the test procedure set forth in Part A of the present section. The results are shown in Table 10, hereinbelow.

TABLE 10

Summary of Examples 110B–120B

| Example | Substrate | Undercoat Layer[1] | Ink Jet Receptive Layer/Binder[2] | Binder-To-Pigment Ratio[3] | Brightness Initial | Brightness After UV | Whiteness Initial | Whiteness After UV | Yellowness Initial | Yellowness After UV | ΔE |
|---|---|---|---|---|---|---|---|---|---|---|---|
| 110B (I-1) | BP-2 | — | XVII/I | 43 | 94.19 | 90.71 | 117.00 | 103.17 | −9.23 | −5.06 | 2.78 |
| 111B (I-12) | BP-2 | — | XVIII/I | 32 | 93.81 | 90.12 | 115.54 | 101.19 | −8.66 | −4.25 | 2.85 |
| 112B (I-1-0) | BP-2 | UCL (I) | XVII/I | 43 | 95.92 | 91.83 | 121.10 | 104.95 | −10.27 | −5.27 | 3.22 |
| 113B (I-12-0) | BP-2 | UCL (I) | XVIII/I | 32 | 95.34 | 91.30 | 118.92 | 103.05 | −9.29 | −4.55 | 3.16 |
| 114B (I-13-0) | BP-2 | UCL (I) | XIX/I | 17 | 94.79 | 90.51 | 117.28 | 100.46 | −8.90 | −3.82 | 3.39 |
| 115B (I-14-0) | BP-2 | UCL (I) | XX/II | 43 | 95.37 | 91.21 | 119.62 | 103.26 | −9.60 | −4.65 | 3.26 |
| 116B (I-15-0) | BP-2 | UCL (I) | XXI/III | 43 | 95.35 | 91.10 | 119.61 | 103.10 | −9.60 | −4.58 | 3.28 |
| 117B (I-16-0) | BP-2 | UCL (I) | XXII/IV | 43 | 95.50 | 91.38 | 120.21 | 104.49 | −9.73 | −4.99 | 3.1 |
| 118B (I-17-0) | BP-2 | UCL (I) | XXIII/V | 43 | 95.16 | 91.20 | 118.58 | 103.18 | −9.21 | −4.60 | 3.06 |
| 119B (I-18-0) | BP-2 | UCL (I) | XXIV/I | 15 | 94.96 | 90.61 | 118.06 | 101.21 | −9.04 | −4.03 | 3.35 |
| 120B (I-19-0) | BP-2 | UCL (I) | XXV/I | 65 | 95.28 | 91.15 | 120.05 | 104.29 | −9.82 | −5.02 | 3.11 |

[1]Basis Weight = 5 g/m$^2$
[2]Basis Weight = 8 g/m$^2$
[3]Binder-To-Pigment Ratio = dry parts binder per 100 parts of dry pigment.

As shown in Table 10, the ink jet receptive layers of the present invention demonstrate good lightfastness (i.e., ΔE values of less than 3.5) within a wide range of binder compositions. When comparing Examples 110B and 111B to Examples 112B and 113B, respectively, it can be seen that the use of an undercoat layer allows for improved brightness and whiteness.

EXAMPLES 121B TO 131B

In these examples, the ink jet recording materials of the present invention were imaged using either an HP-2500 CP or NOVAJET 630 wide format printer and the image densities of the formed images measured and recorded. The results are set forth in Table 11, hereinbelow.

TABLE 11

Summary of Examples 121B to 131B

| | 121B (I-1) | 122B (I-12) | 123B (I-1-U) | 124B (I-12-U) | 125B (I-13-U) | 126B (I-14-U) | 127B (I-15-U) | 128B (I-16-U) | 129B (I-17-U) | 130B (I-18-U) | 131B (I-19-U) |
|---|---|---|---|---|---|---|---|---|---|---|---|
| Undercoat Layer | — | — | UCL (I) | UCL (I) | UCL (I) | UCL (I) | UCL (I) | UCL (I) | UCL (I) | UCL (I) | UCL (I) |
| Ink Jet Receptive Layer/Binder | XVII/I | XVIII/I | XVII/I | XVIII/I | XIX/I | XX/II | XXI/III | XXII/IV | XXIII/V | XXIV/I | XXV/I |

TABLE 11-continued

Summary of Examples 121B to 131B

| | Example | | | | | | | | | | |
|---|---|---|---|---|---|---|---|---|---|---|---|
| | 121B (I-1) | 122B (I-12) | 123B (I-1-U) | 124B (I-12-U) | 125B (I-13-U) | 126B (I-14-U) | 127B (I-15-U) | 128B (I-16-U) | 129B (I-17-U) | 130B (I-18-U) | 131B (I-19-U) |
| Binder-To-Pigment Ratio[1] | 43 | 32 | 43 | 32 | 17 | 43 | 43 | 43 | 43 | 15 | 65 |
| Image Densities | | | | | | | | | | | |
| HP-2500 CP | | | | | | | | | | | |
| Black | 1.66 | 1.43 | 1.55 | 1.39 | 1.38 | 1.63 | 1.53 | 1.66 | 1.53 | 1.34 | 1.62 |
| Magenta | 1.54 | 1.37 | 1.51 | 1.39 | 1.39 | 1.55 | 1.52 | 1.6 | 1.47 | 1.3 | 1.57 |
| Red | 1.46 | 1.34 | 1.49 | 1.36 | 1.4 | 1.52 | 1.52 | 1.58 | 1.46 | 1.35 | 1.51 |
| Yellow | 1.11 | 0.85 | 0.86 | 0.8 | 0.79 | 0.91 | 0.88 | 0.92 | 0.88 | 0.8 | 0.97 |
| Purple | 1.53 | 1.50 | 1.64 | 1.58 | 1.56 | 1.63 | 1.65 | 1.65 | 1.68 | 1.58 | 1.57 |
| Green | 1.49 | 1.50 | 1.61 | 1.55 | 1.53 | 1.63 | 1.61 | 1.63 | 1.63 | 1.5 | 1.56 |
| Cyan | 1.59 | 1.49 | 1.57 | 1.43 | 1.44 | 1.62 | 1.55 | 1.63 | 1.58 | 1.4 | 1.59 |
| SUM | 10.38 | 9.48 | 10.23 | 9.5 | 9.49 | 10.49 | 10.26 | 10.67 | 10.23 | 9.27 | 10.39 |
| NOVAJET630 | | | | | | | | | | | |
| Black | 1.74 | 1.66 | 1.76 | 1.63 | 1.57 | 1.81 | 1.71 | 1.81 | 1.69 | 1.52 | 1.72 |
| Magenta | 1.57 | 1.44 | 1.53 | 1.4 | 1.27 | 1.64 | 1.51 | 1.66 | 1.45 | 1.32 | 1.63 |
| Red | 1.54 | 1.41 | 1.55 | 1.38 | 1.39 | 1.61 | 1.51 | 1.65 | 1.45 | 1.37 | 1.6 |
| Yellow | 0.95 | 0.84 | 0.92 | 0.85 | 0.8 | 0.99 | 0.9 | 1.01 | 0.86 | 0.78 | 1.03 |
| Purple | 1.59 | 1.46 | 1.60 | 1.48 | 1.51 | 1.66 | 1.59 | 1.69 | 1.51 | 1.50 | 1.63 |
| Green | 1.56 | 1.37 | 1.51 | 1.36 | 1.3 | 1.59 | 1.46 | 1.57 | 1.42 | 1.25 | 1.49 |
| Cyan | 1.54 | 1.38 | 1.42 | 1.37 | 1.31 | 1.56 | 1.45 | 1.54 | 1.45 | 1.24 | 1.44 |
| SUM | 10.29 | 9.56 | 10.49 | 9.47 | 9.15 | 10.86 | 10.13 | 10.93 | 9.83 | 8.98 | 10.54 |

Examples 121 to 131B, as shown in Table 11, demonstrate that images recorded on the ink jet recording materials of the present invention, whether or not employing an undercoat layer, will have high image densities that will increase as the binder-to-pigment ratio increases.

Examples 127B to 129B specifically demonstrate that binder compositions employing super hydrolyzed, medium viscosity PVAs or partially hydrolyzed, medium viscosity PVAs are preferred over partially hydrolyzed, low viscosity PVAs, when the binder composition also employs a cationic acrylic resin.

In addition, Examples 121B and 122B and Examples 123B and 124B demonstrate that the cationic acrylic resin component in the binder composition serves to enhance image densities.

EXAMPLES 132B TO 142B

In these examples, the ink jet recording materials of the present invention were imaged using either an HP-2500 CP or NOVAJET 630 wide format printer and the imaged recording materials evaluated for lightfastness, waterfastness, mottle, wicking, intercolor bleeding and humidity resistance. The results are set forth in Table 12, hereinbelow.

TABLE 12

Summary of Examples 132B–142B

| | Example | | | | | | | | | | |
|---|---|---|---|---|---|---|---|---|---|---|---|
| | 132B (I-1) | 133B (I-12) | 134B (I-1-U) | 135B (I-12-U) | 136B (I-13-U) | 137B (I-14-U) | 138B (I-15-U) | 139B (I-16-U) | 140B (I-17-U) | 141B (I-18-U) | 142B (I-19-U) |
| Undercoat Layer | — | — | UCL (1) | UCL (1) | UCL (1) | UCL (1) | UCL (1) | UCL (1) | UCL (1) | UCL (1) | UCL (1) |
| Ink Jet Receptive Layer/Binder | XVII/I | XVIII/I | XVII/I | XVIII/I | XIX/I | XX/II | XXI/III | XXII/IV | XXIII/V | XXIV/I | XXV/I |
| Binder-To-Pigment Ratio[1] | 43 | 32 | 43 | 32 | 17 | 43 | 43 | 43 | 43 | 15 | 65 |
| HP-2500 CP | | | | | | | | | | | |
| Lightfastness (%) | 94 | 94 | 96 | 97 | 95 | 96 | 96 | 96 | 96 | 94 | 95 |
| Waterfastness (%) | 101 | 102 | 101 | 105 | 103 | 100 | 101 | 98 | 96 | 103 | 101 |

TABLE 12-continued

Summary of Examples 132B–142B

| | Example | | | | | | | | | | |
|---|---|---|---|---|---|---|---|---|---|---|---|
| | 132B (I-1) | 133B (I-12) | 134B (I-1-U) | 135B (I-12-U) | 136B (I-13-U) | 137B (I-14-U) | 138B (I-15-U) | 139B (I-16-U) | 140B (I-17-U) | 141B (I-18-U) | 142B (I-19-U) |
| Waterfastness (V) | 1 | 1 | 1 | 1 | 1 | 1 | 1 | 2 | 2 | 1 | 2 |
| Mottle (P, F) | P | P | P | P | P | P | P | P | P | P | P |
| Wicking | 1 | 1 | 1 | 1 | 1 | 1 | 1 | 1 | 1 | 1 | 1 |
| Intercolor Bleeding | 3 | 2 | 2 | 2 | 1 | 1 | 3 | 1 | 1 | 1 | 2 |
| Humidity Resistance (%) | 102 | 103 | 105 | 101 | 105 | 103 | 102 | 106 | 102 | 108 | 106 |
| Δ (max %—100) | 8 | 7 | 9 | 5 | 10 | 8 | 4 | 14 | 9 | 30 | 9 |
| NOVAJET 630 | | | | | | | | | | | |
| Lightfastness (%) | 85 | 84 | 86 | 85 | 83 | 83 | 80 | 84 | 86 | 90 | 84 |
| Waterfastness (%) | 102 | 103 | 100 | 106 | 107 | 98 | 101 | 97 | 102 | 109 | 99 |
| Waterfastness (V) | 3 | 3 | 3 | 3 | 3 | 3 | 3 | 3 | 3 | 2 | 3 |
| Mottle (P, F) | P | P | P | P | P | P | P | P | P | P | P |
| Wicking | 1 | 1 | 1 | 1 | 1 | 1 | 1 | 1 | 1 | 1 | 1 |
| Intercolor Bleeding | 1 | 1 | 1 | 1 | 1 | 2 | 2 | 2 | 1 | 1 | 2 |
| Humidity Resistance (%) | 119 | 115 | 117 | 122 | 131 | 115 | 117 | 114 | 120 | 129 | 110 |
| Δ (max %—100) | 55 | 50 | 53 | 61 | 71 | 47 | 52 | 39 | 57 | 77 | 25 |

[1]Binder-To-Pigment Ratio = dry parts binder per 100 parts of dry pigment.

As shown in Table 12, the ink jet recording materials of the present invention (e.g., Examples 132B to 134B and 142B) demonstrate good lightfastness and waterfastness, excellent wicking performance, low intercolor bleeding and good humidity resistance, while producing printed images having visual uniformity.

It is noted that increased amounts of cationic resins in the ink jet receptive layer of the present invention will serve to further enhance waterfastness. Cationic resins, however, adversely impact upon optical densities. As will be readily appreciated by those skilled in the art, the high optical densities demonstrated by the inventive ink jet recording materials allow for increasing the quantity of cationic resins in the ink jet receptive layer while maintaining significantly higher image densities than otherwise possible.

Examples 134B, 141B and 142B further demonstrate that humidity resistance is generally increased by increasing the binder-to-pigment ratio.

While the subject invention has been described in detail with reference to specific embodiments thereof, it will be apparent to those skilled in the art that various changes and modifications can be made therein without departing from the spirit and scope thereof.

We claim:
1. An aqueous coating formulation for an ink jet recording material, which consists essentially of:
   (i) from about 45 to about 80% by dry wt., based on the total dry weight of the coating formulation, of a pigment composition comprising from about 10 to about 90% by dry wt., based on the total dry weight of the pigment composition, of a first pigment selected from porous organic pigments, porous inorganic pigments, metal oxide gels, or mixtures thereof, and from about 90 to about 10% by dry wt., based on the total dry weight of the pigment composition, of a second pigment selected from calcium carbonate, or mixtures of calcium carbonate and alumina,
   wherein the sum of the pigment composition components total 100% by dry wt.;
   (ii) from about 10 to about 45% by dry wt., based on the total dry weight of the coating formulation, of a water-soluble binder consisting essentially of super, fully and partially hydrolyzed polyvinyl alcohols and mixtures thereof and, optionally, a cationic acrylic resin;
   (iii) from about 1 to about 25% by dry wt., based on the total dry weight of the coating formulation, of a cationic resin;
   (iv) an effective amount of an optionally fluorescent whitening agent; and
   (v) optionally, an effective amount of a blueing dye,
   wherein, the sum of the coating formulation components total 100% by dry wt.,
   wherein, the binder/pigment dry weight ratio in the coating formulation ranges from about 1:8 to about 1:1,
   wherein, when an optionally fluorescent whitening agent and a blueing dye are present in the coating formulation, the optionally fluorescent whitening agent/blueing dye dry weight ratio in the formulation ranges from about 1:1 to about 1000:1, and
   wherein, the aqueous coating formulation has a solids content ranging from about 15 to about 35% by weight, based on the total dry weight of the coating formulation.

2. The aqueous coating formulation of claim 1, wherein the first pigment is a porous organic pigment selected from acrylic resins, poly(vinylpolypyrriolidone), styrene resins, styrene-acrylic resins, urea-formaldehyde resins, polyvinyl chlorides, polycarbonates, or mixtures thereof.

3. The aqueous coating formulation of claim 1, wherein the first pigment is a porous inorganic pigment selected from porous alumina, porous sodium aluminosilicate, porous calcium carbonate, porous clays, porous magnesium carbonate, porous synthetic amorphous silica, or mixtures thereof.

4. The aqueous coating formulation of claim 1, wherein the first pigment is a metal oxide gel selected from alumina gels, silica gels, polymeric gels, urea-formaldehyde gels, titania gels, or mixtures thereof.

5. The aqueous coating formulation of claim 4, wherein the metal oxide gel is a silica gel having a surface area ranging from about 200 to about 800 square meters per gram, a pore volume ranging from about 0.4 to about 3.0 cubic centimeters per gram, an average particle size ranging from about 1 to about 17 microns and a pH ranging from about 2.5 to about 10.5.

6. The aqueous coating formulation of claim 1, wherein the second pigment is calcium carbonate.

7. The aqueous coating formulation of claim 6, wherein the calcium carbonate is a precipitated calcium carbonate having a surface area ranging from about 10 to about 300 square meters per gram and a particle size ranging from about 0.1 to about 5 microns.

8. The aqueous coating formulation of claim 1, wherein the second pigment is a mixture of calcium carbonate and alumina.

9. The aqueous coating formulation of claim 8, wherein the mixture comprises from about 60 to about 99% by dry wt. of calcium carbonate and from about 40 to about 1% by dry wt. of alumina.

10. The aqueous coating formulation of claim 9, wherein the calcium carbonate is a precipitated calcium carbonate having a surface area ranging from about 10 to about 300 square meters per gram and a particle size ranging from about 0.1 to about 5 microns, and wherein the alumina has an average particle diameter ranging from about 0.1 to about 3.0 microns.

11. The aqueous coating formulation of claim 1, wherein the cationic acrylic resin is selected from cationic styrene-acrylic resins, cationic styrene-acrylic copolymers, amide-modified cationic styrene-acrylic resins or cationic vinyl acrylic resins.

12. The aqueous coating formulation of claim 1, wherein the water-soluble binder consists essentially of:
  (i) from about 10 to about 90% by dry wt. of a super hydrolyzed, medium viscosity polyvinyl alcohol;
  (ii) from about 10 to about 70% by dry wt. of a partially hydrolyzed, medium viscosity polyvinyl alcohol; and
  (iii) from about 0 to about 20% by dry wt. of a partially hydrolyzed, low viscosity polyvinyl alcohol.

13. The aqueous coating formulation of claim 1, wherein the binder/pigment dry weight ratio in the coating formulation ranges from about 1:6 to about 1:1.5.

14. The aqueous coating formulation of claim 13, wherein the binder/pigment dry weight ratio in the coating formulation ranges from about 1:2.8 to about 1:1.8.

15. The aqueous coating formulation of claim 1, wherein the cationic resin is selected from polyvinyl benzyl trimethyl ammonium chloride, polydiallyl dimethyl ammonium chloride, polymethacryloxyethyl hydroxy ethyldiammonium chloride, quaternary acrylic copolymer latex, amidoepichlohydrin copolymer, dimethylaminoethylmethacrylate copolymer, vinyl pyrrolidone dimethylaminoethylmethacrylate copolymer, polyallylamine, polyvinylamine, vinyl amine acrylonitrile copolymers, polyalkylene imine polymers, polyalkylene polyamine polymers, polyalkylene polyamide dicyandiamide copolymers, polyamide dicyandiamide copolymers, quaternary ammonium polymers, or mixtures thereof.

16. The aqueous coating formulation of claim 1, wherein the optionally fluorescent whitening agent is selected from disulfonated, tetrasulfonated, or hexasulfonated stilbene optionally fluorescent whitening agents.

17. The aqueous coating formulation of claim 1, which further comprises a blueing dye selected from cobalt blue, copper phthalocyanine, metal-free phthalocyanine, oxide cobalt phosphate, dye complex salts, quinacridone pigments, ultramarine blue, or mixtures thereof.

18. An aqueous coating formulation for an ink jet recording material, which consists of:
  (i) from about 45 to about 80% by dry wt., based on the total dry weight of the coating formulation, of a pigment composition comprising from about 10 to about 90% by dry wt., based on the total dry weight of the pigment composition, of a first pigment selected from porous organic pigments, porous inorganic pigments, metal oxide gels, or mixtures thereof, and from about 90 to about 10% by dry wt., based on the total dry weight of the pigment composition, of a second pigment selected from calcium carbonate, or mixtures of calcium carbonate and alumina,
    wherein the sum of the pigment composition components total 100% by dry wt.;
  (ii) from about 10 to about 45% by dry wt., based on the total dry weight of the coating formulation, of a water-soluble binder consisting essentially of super, fully and partially hydrolyzed polyvinyl alcohols and mixtures thereof and, optionally, a cationic acrylic resin;
  (iii) from about 1 to about 25% by dry wt., based on the total dry weight of the coating formulation, of a cationic resin;
  (iv) an effective amount of an optionally fluorescent whitening agent; and
  (v) optionally, an effective amount of a blueing dye,
  wherein, the sum of the coating formulation components total 100% by dry wt.,
  wherein, the binder/pigment dry weight ratio in the coating formulation ranges from about 1:8 to about 1:1,
  wherein, when an optionally fluorescent whitening agent and a blueing dye are present in the coating formulation, the optionally fluorescent whitening agent/blueing dye dry weight ratio in the formulation ranges from about 1:1 to about 1000:1, and
  wherein, the aqueous coating formulation has a solids content ranging from about 15 to about 35% by weight, based on the total dry weight of the coating formulation.

19. An aqueous coating formulation for an ink jet recording material, which consists essentially of:
  (i) from about 50 to about 75% by dry wt., based on the total dry weight of the coating formulation, of a pigment composition comprising from about 20 to about 80% by dry wt., based on the total dry weight of the pigment composition, of a silica gel, and from about 80 to about 20% by dry wt., based on the total dry weight of the pigment composition, of precipitated calcium carbonate,
    wherein the sum of the pigment composition components total 100% by dry wt.;

(ii) from about 15 to about 40% by dry wt., based on the total dry weight of the coating formulation, of a water-soluble binder consisting essentially of:
  (a) from about 20 to about 70% by dry wt., based on the total dry weight of the binder, of a medium molecular weight polyvinyl alcohol selected from super hydrolyzed, medium molecular weight polyvinyl alcohols, fully hydrolyzed, medium molecular weight polyvinyl alcohols, or mixtures thereof;
  (b) from about 70 to about 25% by dry wt., based on the total dry weight of the binder, of a partially hydrolyzed, medium-to-low molecular weight polyvinyl alcohol; and
  (c) from about 5 to about 35% by dry wt., based on the total dry weight of the binder, of a cationic styrene acrylic copolymer;
(iii) from about 3 to about 15% by dry wt., based on the total dry weight of the coating formulation, of polydiallyl dimethyl ammonium chloride;
(iv) from about 0.01 to about 1.5% by wt. of a hexasulfonated stilbene optionally fluorescent whitening agent; and
(v) from about 0.001 to about 0.05% by dry wt. of a phthalocyanine dye stuff,
wherein, the sum of the coating formulation components total 100% by dry wt.,
wherein, the binder/pigment dry weight ratio in the coating formulation ranges from about 1:6 to about 1:1.5, and
wherein, the whitening agent/blueing dye dry weight ratio in the formulation ranges from about 2:1 to about 800:1.

20. A method of using an aqueous coating formulation to prepare an ink jet recording material, wherein the ink jet recording material comprises a substrate, optionally one or more undercoat layers located on the substrate, and one or more ink jet receptive layers located on either the undercoat layer(s) or the substrate, wherein the method comprises: using the aqueous coating formulation to make the one or more ink jet receptive layers, wherein the aqueous coating formulation comprises:
  (i) from about 45 to about 80% by dry wt., based on the total dry weight of the coating formulation, of a pigment composition comprising from about 10 to about 90% by dry wt., based on the total dry weight of the pigment composition, of a first pigment selected from porous organic pigments, porous inorganic pigments, metal oxide gels, or mixtures thereof, and from about 90 to about 10% by dry wt., based on the total dry weight of the pigment composition, of a second pigment selected from calcium carbonate, or mixtures of calcium carbonate and alumina,
    wherein the sum of the pigment composition components total 100% by dry wt.;
  (ii) from about 10 to about 45% by dry wt., based on the total dry weight of the coating formulation, of a water-soluble binder consisting essentially of super, fully and partially hydrolyzed polyvinyl alcohols and mixtures thereof and, optionally, one or more cationic acrylic resins;
  (iii) from about 1 to about 25% by dry wt., based on the total dry weight of the coating formulation, of a cationic resin;
  (iv) an effective amount of an optionally fluorescent whitening agent; and
  (v) optionally, an effective amount of a blueing dye,
    wherein, the sum of the coating formulation components total 100% by dry wt.,
    wherein, the binder/pigment dry weight ratio in the coating formulation ranges from about 1:8 to about 1:1,
    wherein, when an optionally fluorescent whitening agent and a blueing dye are present in the coating formulation, the optionally fluorescent whitening agent/blueing dye dry weight ratio in the formulation ranges from about 1:1 to about 1000:1, and
    wherein, the aqueous coating formulation has a solids content ranging from about 15 to about 35% by weight, based on the total dry weight of the coating formulation.

21. A method of using an aqueous coating formulation to prepare an ink jet recording material, wherein the ink jet recording material consists of a substrate, optionally one or more undercoat layers located on the substrate, and one or more ink jet receptive layers located on either the undercoat layer(s) or the substrate, wherein the method comprises: using the aqueous coating formulation to make the one or more ink jet receptive layers, wherein the aqueous coating formulation comprises:
  (i) from about 50 to about 75% by dry wt., based on the total dry weight of the coating formulation, of a pigment composition comprising from about 20 to about 80% by dry wt., based on the total dry weight of the pigment composition, of a silica gel, and from about 80 to about 20% by dry wt., based on the total dry weight of the pigment composition, of precipitated calcium carbonate,
    wherein the sum of the pigment composition components total 100% by dry wt.;
  (ii) from about 15 to about 40% by dry wt., based on the total dry weight of the coating formulation, of a water-soluble binder consisting essentially of:
    (a) from about 20 to about 70% by dry wt., based on the total dry weight of the binder, of a medium molecular weight polyvinyl alcohol selected from super hydrolyzed, medium molecular weight polyvinyl alcohols, fully hydrolyzed, medium molecular weight polyvinyl alcohols, or mixtures thereof;
    (b) from about 70 to about 25% by dry wt., based on the total dry weight of the binder, of a partially hydrolyzed, medium-to-low molecular weight polyvinyl alcohol; and
    (c) from about 5 to about 35% by dry wt., based on the total dry weight of the binder, of a cationic styrene acrylic copolymer;
  (iii) from about 3 to about 15% by dry wt., based on the total dry weight of the coating formulation, of polydiallyl dimethyl ammonium chloride;
  (iv) from about 0.01 to about 1.5% by wt. of a hexasulfonated stilbene optionally fluorescent whitening agent; and
  (v) from about 0.001 to about 0.05% by dry wt. of a phthalocyanine dye stuff,
    wherein, the sum of the coating formulation components total 100% by dry wt.,
    wherein, the binder/pigment dry weight ratio in the coating formulation ranges from about 1:6 to about 1:1.5, and
    wherein, the whitening agent/blueing dye dry weight ratio in the formulation ranges from about 2:1 to about 800:1.

* * * * *